(12) United States Patent
Jones et al.

(10) Patent No.: US 10,567,912 B2
(45) Date of Patent: *Feb. 18, 2020

(54) SYSTEM FOR TRACKING PHYSICAL OBJECTS

(71) Applicant: Walmart Apollo, LLC, Bentonville, AR (US)

(72) Inventors: Nicholaus Adam Jones, Fayetteville, AR (US); Aaron Vasgaard, Fayetteville, AR (US); Robert James Taylor, Rogers, AR (US); Matthew Allen Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/277,594

(22) Filed: Feb. 15, 2019

(65) Prior Publication Data

US 2019/0182618 A1    Jun. 13, 2019

Related U.S. Application Data

(63) Continuation of application No. 15/464,483, filed on Mar. 21, 2017, now Pat. No. 10,251,024.
(Continued)

(51) Int. Cl.
*H04W 4/02* (2018.01)
*H04L 29/08* (2006.01)
(Continued)

(52) U.S. Cl.
CPC .......... *H04W 4/023* (2013.01); *G06K 7/1095* (2013.01); *G06K 7/1413* (2013.01);
(Continued)

(58) Field of Classification Search
CPC ....... G06K 2007/10524; G06K 7/1413; G06Q 30/0633; G06Q 30/0641; H04W 4/023; H04W 4/028; H04W 4/029
See application file for complete search history.

(56) References Cited

U.S. PATENT DOCUMENTS 6,018,397 A    1/2000 Cloutier et al.
6,601,759 B2   8/2003 Fife et al.
(Continued)

OTHER PUBLICATIONS

Pillar, Matt, Innovative Retail Technologies, Wireless Price Verifiers: More than Customer Service, Coyright 1996-2016.
(Continued)

*Primary Examiner* — Liton Miah
(74) *Attorney, Agent, or Firm* — McCarter & English, LLP; David R. Burns

(57) ABSTRACT

Described in detail herein are systems and methods for determining in situ locations of physical objects using mobile devices within a facility. Multiple mobile devices may scan different identifiers of different physical objects disposed in a facility. The mobile devices may transmit the identifiers to a distributed computing system. The distributed computing system may query a database to determine the in situ location of the physical objects associated with the identifiers. In response to not being able to retrieve a in situ location of a physical object, the distributed computing system may determine a path of the mobile device which transmitted the identifier associated with the physical object with the unknown in situ location. The distributed computing system may determine the in situ location of the physical object for which the in situ location was unknown based on the path and the known locations of the other physical objects.

17 Claims, 27 Drawing Sheets

Related U.S. Application Data

(60) Provisional application No. 62/312,002, filed on Mar. 23, 2016.

(51) Int. Cl.
| | | |
|---|---|---|
| *G07G 1/00* | (2006.01) | |
| *G06Q 20/32* | (2012.01) | |
| *G06K 7/10* | (2006.01) | |
| *H04W 4/029* | (2018.01) | |
| *G06K 7/14* | (2006.01) | |
| *G06Q 20/20* | (2012.01) | |
| *G06Q 30/06* | (2012.01) | |

(52) U.S. Cl.
CPC .......... *G06Q 20/202* (2013.01); *G06Q 20/32* (2013.01); *G06Q 30/0633* (2013.01); *G06Q 30/0641* (2013.01); *G07G 1/0081* (2013.01); *H04L 67/04* (2013.01); *H04L 67/10* (2013.01); *H04L 67/18* (2013.01); *H04W 4/029* (2018.02); *G06K 2007/10524* (2013.01)

(56) References Cited

U.S. PATENT DOCUMENTS

| | | |
|---|---|---|
| 6,606,411 B1 | 8/2003 | Loui et al. |
| 6,745,186 B1 | 6/2004 | Testa et al. |
| 6,810,149 B1 | 10/2004 | Squilla et al. |
| 6,886,101 B2 | 4/2005 | Glazer et al. |
| 6,937,989 B2 | 8/2005 | McIntyre et al. |
| 7,006,982 B2 | 2/2006 | Sorensen |
| 7,177,820 B2 | 2/2007 | McIntyre et al. |
| 7,222,363 B2 | 5/2007 | Rice et al. |
| 7,431,208 B2 | 10/2008 | Feldman et al. |
| 7,587,756 B2 | 9/2009 | Peart et al. |
| 7,716,064 B2 | 5/2010 | McIntyre et al. |
| 8,069,092 B2 | 11/2011 | Bryant |
| 8,207,851 B2 | 6/2012 | Christopher |
| 8,572,712 B2 | 10/2013 | Rice et al. |
| 8,814,039 B2 | 8/2014 | Bishop et al. |
| 8,820,633 B2 | 9/2014 | Bishop et al. |
| 8,851,369 B2 | 10/2014 | Bishop et al. |
| 8,930,134 B2 | 1/2015 | Gu et al. |
| 10,262,331 B1* | 4/2019 | Sharma ................ H04W 4/029 |
| 2003/0055707 A1 | 3/2003 | Busche et al. |
| 2005/0256786 A1 | 11/2005 | Sands et al. |
| 2006/0200378 A1 | 9/2006 | Sorensen |
| 2008/0306756 A1 | 12/2008 | Sorensen et al. |
| 2009/0012704 A1 | 1/2009 | Franco et al. |
| 2011/0029997 A1 | 2/2011 | Wolinsky |
| 2012/0095805 A1 | 4/2012 | Ghosh et al. |
| 2012/0123674 A1 | 5/2012 | Perks et al. |
| 2013/0103539 A1 | 4/2013 | Abraham et al. |
| 2013/0282533 A1 | 10/2013 | Foran-Owens et al. |
| 2014/0359510 A1 | 12/2014 | Graf et al. |
| 2015/0039458 A1* | 2/2015 | Reid ................ G06K 9/00335 705/26.1 |
| 2015/0100383 A1 | 4/2015 | Chauhan |
| 2015/0199890 A1* | 7/2015 | Hewett ............. G08B 13/2451 340/572.1 |
| 2015/0269549 A1 | 9/2015 | Herring et al. |
| 2016/0041000 A1 | 2/2016 | Nallu et al. |

OTHER PUBLICATIONS

Kopytoff, Verne, MIT Technology Review, Stores Sniff Out Smartphones to Follow Shoppers: Indoor location technology brings Internet-style tracking to physical spaces, Nov. 2013.

\* cited by examiner

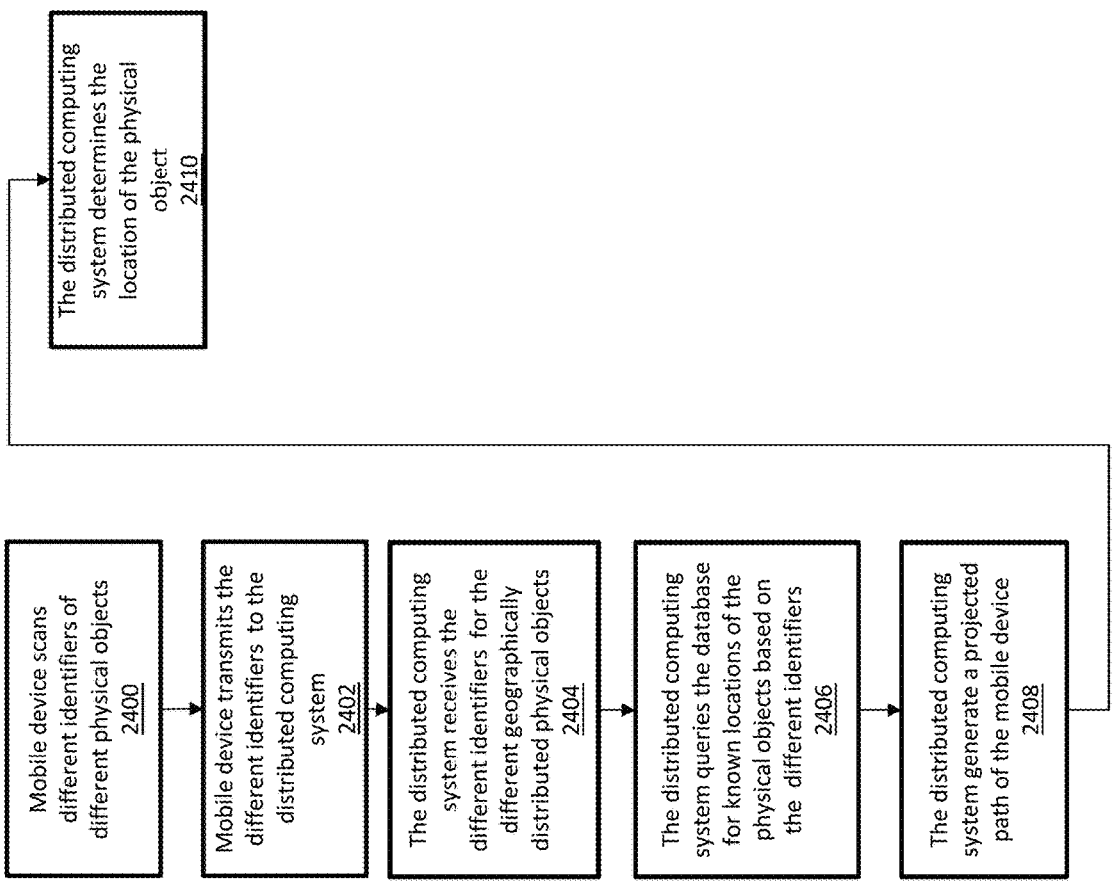

SYSTEM FOR TRACKING PHYSICAL OBJECTS

CROSS-REFERENCE TO RELATED PATENT APPLICATIONS

This application is a continuation application of U.S. patent application Ser. No. 15/464,483 filed on Mar. 21, 2017 which claims priority to U.S. Provisional Application No. 62/312,002 filed on Mar. 23, 2016, the content of which is hereby incorporated by reference in its entirety.

BACKGROUND

In some environments, it can be important to know the locations at which objects are disposed and/or from which objects are removed. Determining and verifying an original location of physical objects can be difficult particularly after those physical objects have been removed from their original location.

BRIEF DESCRIPTION OF DRAWINGS

Illustrative embodiments are shown by way of example in the accompanying drawings and should not be considered as a limitation of the present disclosure:

FIG. 24 is a flowchart illustrating an exemplary process for a tracking system in accordance with exemplary embodiments of the present disclosure.

DETAILED DESCRIPTION

Figure 1A:
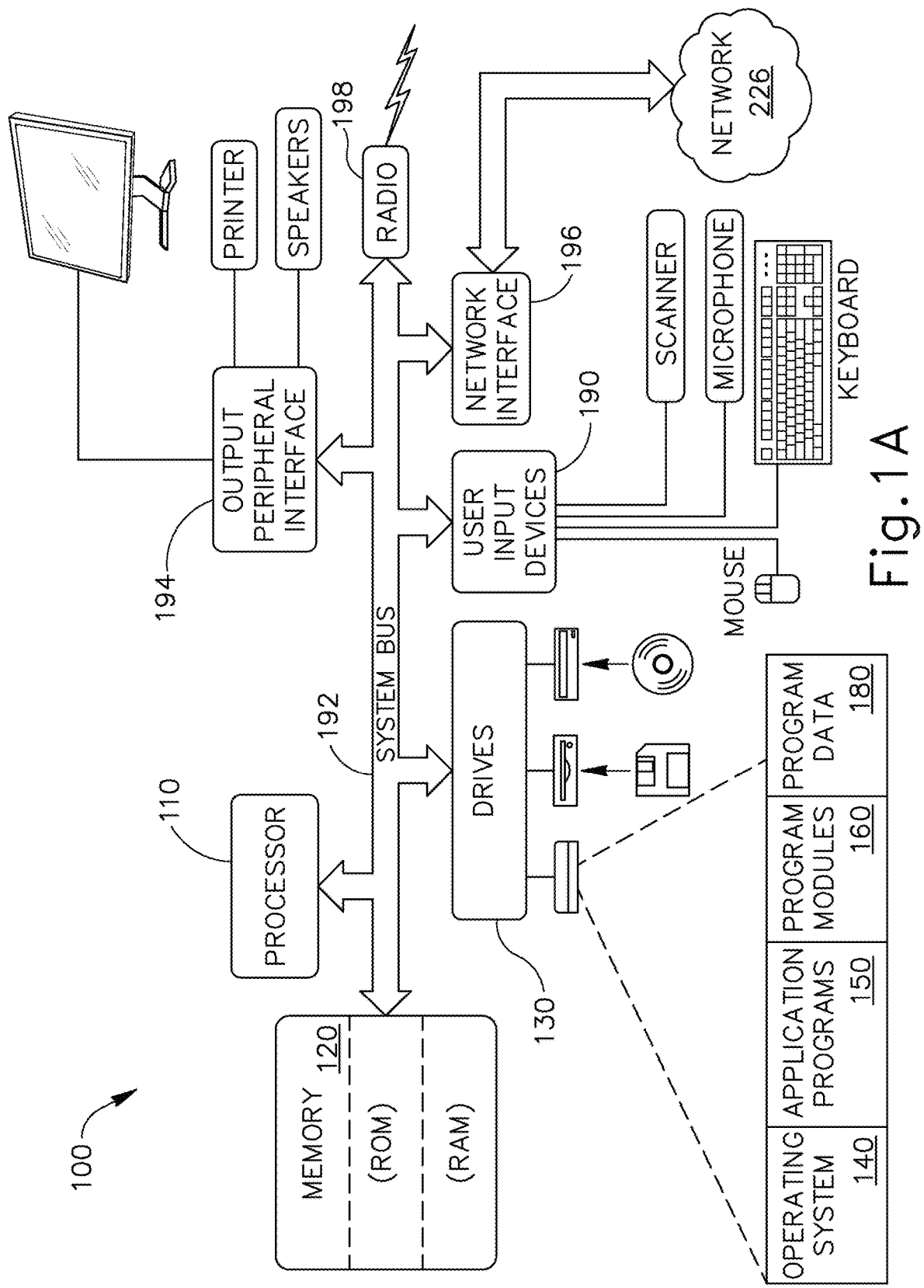
FIG. 1A depicts a block schematic diagram of an exemplary computing system, in accordance with one embodiment of the present invention.

Described in detail herein are systems and methods for determining in situ locations of physical objects (e.g., original or resting locations of physical objects) when the in situ locations are unknown. Mobile devices can execute a terminal sales application. The mobile device, via the terminal sales application, can scan different identifiers (optical machine-readable representations) of different physical objects disposed in a facility and the users of the mobile devices may remove the physical objects from their in situ location as the physical objects are scanned. The mobile devices may transmit the identifiers, via the terminal sales application, to a distributed computing system, and the distributed computing system may query a database to determine the in situ location of the physical objects associated with the identifiers scanned via the mobile device. In response to being unable to retrieve an in situ location of a physical object, the distributed computing system may determine projected paths of the mobile devices based on the identifiers associated with the physical objects and can use the projected paths to estimate the in situ location for the physical objects having unknown in situ locations. The distributed computing system may use the known in situ locations of physical objects associated with the other identifiers transmitted by the mobile device. The distributed computing system may determine the in situ locations of the physical objects for which the in situ locations were unknown based on the projected path and the known locations of the other physical objects.

In exemplary embodiments, in response to determining an in situ location of a physical object having an unknown in situ location, the in situ location is verified to determine whether the in situ location of the physical object corresponds to an expected location.

The distributed computing system can generate a projected path by placing data points of scanned identifiers with known in situ locations on a map. The distributed computing system determines and verifies an in situ location by interpolating the in situ location as an added data point at a point along the projected path based on, for example, the order in which the identifiers associated with the physical objects are scanned, overlaying an existing map including an expected in situ location corresponding to a location at which the at least one physical object was expected to be disposed, and determining whether the added data point and the overlaid data point correlate with each other.

In exemplary embodiments, in response to determining the in situ location of a physical object having an unknown in situ location, the distributed computing system can trigger one or more events. The one or more events can include, but are not limited to, issuing an alert, storing the determined in situ location of the at least one physical object, determining a new in situ location to which like physical objects should be moved.

With reference to FIG. 1A, depicted is an exemplary computing system for implementing embodiments. FIG. 1 includes a computer 100, which could be any one of a mobile device 200 or distributed computing system 240. Computer 100 may be a portable device, wherein at least some or all of its components are formed together in a single device which can be carried around by a person. The computer 100 includes a processor 110, memory 120 and one or more drives 130. The drives 130 and their associated computer readable memory medium provide storage of computer readable instructions, data structures, program modules and other data for the computer 100. Drives 130 can include an operating system 140, application programs 150, program modules 160, and program data 180. Computer 100 further includes input devices 190 through which data may enter the computer 100, either automatically or by a user who enters commands and data. Input devices 190 can include an electronic digitizer, a flatbed scanner, a barcode reader, a microphone, a camera, a video camera, a keyboard and a pointing device, commonly referred to as a mouse, a trackball or a touch pad, a pinpad, any USB device, any Bluetooth enabled device, an RFID or NFC device, and a debit card reader. Other input devices may include a joystick, game pad, satellite dish, scanner, and the like. In one or more embodiments, input devices 190 are portable devices that can direct display or instantiation of applications running on processor 110.

These and other input devices 190 can be connected to processor 110 through a user input interface that is coupled to a system bus 192, but may be connected by other interface and bus structures, such as a parallel port, game port or a universal serial bus (USB). Computers such as computer 100 may also include other peripheral output devices such as speakers, printers, and/or display devices, which may be connected through an output peripheral interface 194 and the like.

Computer 100 also includes a radio 198 or other type of communications device for wirelessly transmitting and receiving data for the computer 100 with the aid of an antenna. Radio 198 may wirelessly transmit and receive data using WiMAX™, 802.11a/b/g/n, Bluetooth™, 2G, 2.5G, 3G, and 4G, wireless standards.

Computer 100 may operate in a networked environment using logical connections to one or more remote computers, such as a distributed computing system 240. The distributed computing system 240 may be a personal computer, a server, a router, a network PC, a peer device or other common network node, and may include many if not all of the elements described above relative to computer 100. Networking environments are commonplace in offices, enterprise-wide computer networks, intranets and the Internet. For example, in the subject matter of the present application, computer 100 may comprise the source machine from which data is being migrated, and the remote computer may comprise the destination machine. Note, however, that source and destination machines need not be connected by a network or any other means, but instead, data may be migrated via any media capable of being written by the source platform and read by the destination platform or platforms. When used in a LAN or WLAN networking environment, computer 100 is connected to the LAN through a network interface 196 or an adapter. When used in a WAN networking environment, computer 100 typically includes a modem or other means for establishing communications over the WAN, such as radio 198, to environments such as the Internet. It will be appreciated that other means of establishing a communications link between computer 100 and other computers may be used.

Figure 1B:
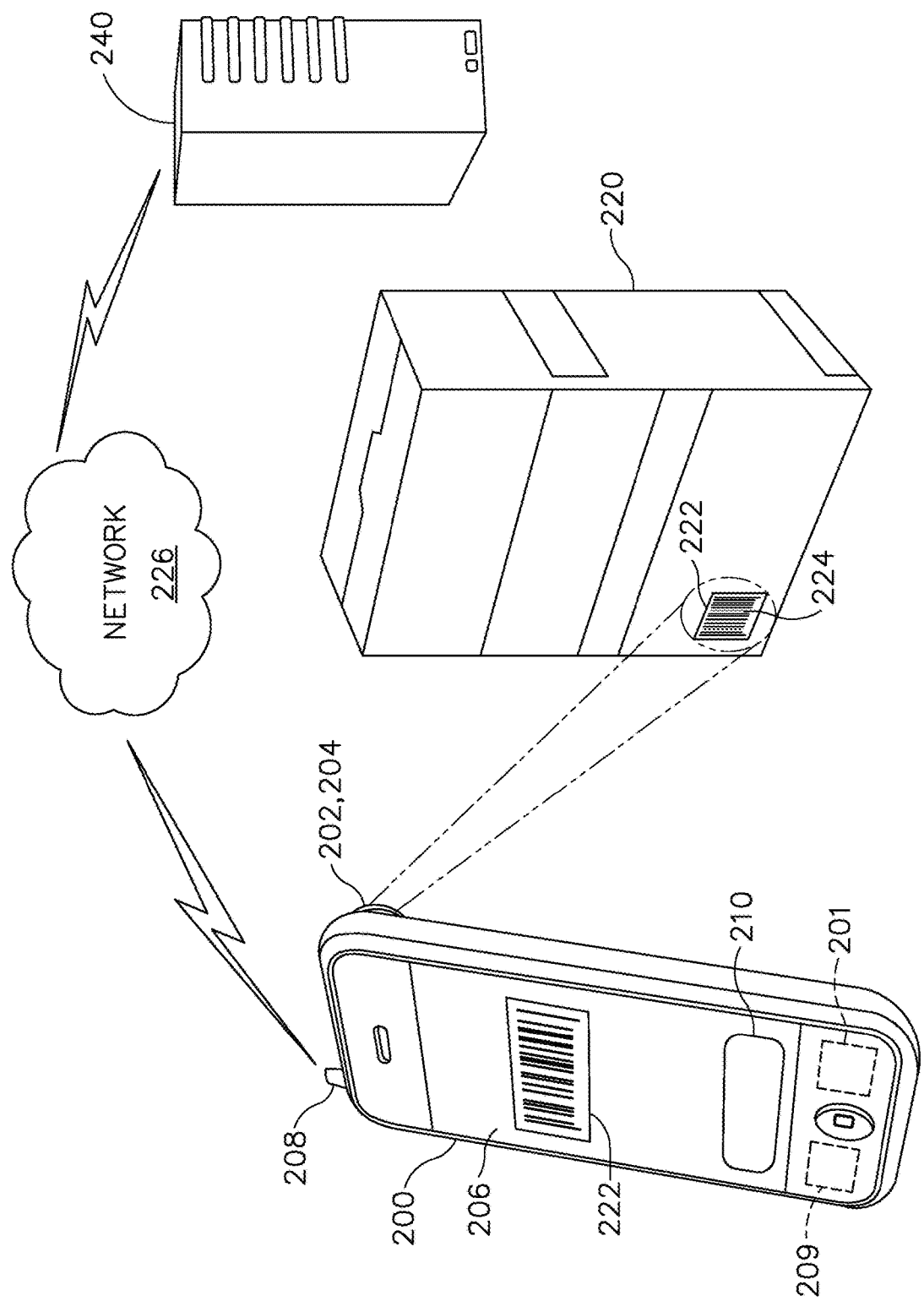
FIG. 1B depicts an illustration of a mobile device receiving identification information from an item and communicating with a distributed computing system, in accordance with one embodiment of the present invention.

With reference to FIG. 1B, illustrated is an exemplary representation of a mobile device 200 for purchasing an item 220 from a retailer at a retail establishment. Mobile device 200 includes any portable electronic device having a processor 201 for executing applications and a display 206 for displaying information connected with the processor 201, and includes such devices as a personal desktop assistant (PDA), a portable computer, a mobile telephone, a smartphone, a netbook, and a tablet computer. Display 206 can use any of a variety of types of display technologies, such as a liquid crystal display (LCD), a cathode-ray tube type display, an electronic ink display, a light emitting diode (LED) type display such as an OLED display, and a plasma display. Preferably, the mobile device 200 also includes a communications device 208 and an optical reader 202. The communications device 208 is connected with the processor 201 and capable of sending and receiving information between one or more other computers connected with the mobile device 200. Preferably, communications device 208 is capable of wirelessly transmitting signals to another computer, such as distributed computing system 240, using a radio transmitter and a radio receiver connected with an antenna. The optical reader 202 is capable of receiving identification information 222 from an item 220 and converting the identification information 222 into a format that the processor 201 can read, such as digital data. Preferably, Optical reader 202 includes any device which can capture, receive and process optical information, such as a barcode or any image, and includes devices such as a digital scanner, a digital camera, a video camera, a barcode reader, and any other type of digital or analog imaging device.

Preferably, communications device 208 communicates with another computer 100, such as distributed computing system 240, via a network 226 using a network interface 209. Network interface 209 is connected with processor 201 and communications device 208, and preferably disposed within remote device 200.

Network 226 may include any type of network that is capable of sending and receiving communication signals, including signals for multimedia content, images, data and streaming video. Network 226 may include a data network, such as the Internet, an intranet, a local area network (LAN), a wide area network (WAN), a cable network, and other like systems that are capable of transmitting information, such as digital data, and the like. Network 226 may also include a telecommunications network, such as a local telephone network, long distance telephone network, cellular telephone network, satellite communications network, cable television network and other like communications systems that interact with computer systems to enable transmission of information between mobile device 200 and another computer such as distributed computing system 240. Network 226 may include more than one network and may include a plurality of different types of networks. Thus, network 226 may include a plurality of data networks, a plurality of telecommunications networks, cable systems, satellite systems and/or a combination of data and telecommunications networks and other like communication systems.

Network 226 is connected with both mobile device 200 and distributed computing system 240 and allows for information to be transmitted and shared between mobile device 200 and distributed computing system 240. Distributed computing system 240 includes any type of computer which can receive, store, process, and transmit information to another computer and includes devices such as a server based computer system capable of interacting with one or more other computer systems.

In one embodiment, mobile device 200 includes location information processing means which allows the mobile device 200 to determine its location. Location information processing means includes devices such a Global Positioning System (GPS) based device, and methods such as using radio triangulation to determine the location of the mobile device 200. Preferably, mobile device 200 includes input means 210 for entering information from a user into the mobile device 200. Input means includes any device which can assist a user to enter information, such as a keyboard, a mouse, a touchpad, a touchscreen, a joystick, a button, and a dial.

Item 220 includes any item or service which is being sold by a retailer. Preferably, the item 220 is located with a retail establishment or store. Item 220 includes item identification information 222 which is any information on the item 220 which assists in identifying the item 220, such as a barcode 224, a serial number, a name of the item 220, and any text, characters, illustrations, or images on the item 220 which can be used to identify the item 220.

In some embodiments, the distributed computing system 240 can include a path generating module, a location finder module and an event module. The path generating module, the location finder module and the event module will be discussed in further detail with respect to FIG. 23.

Figure 2A:
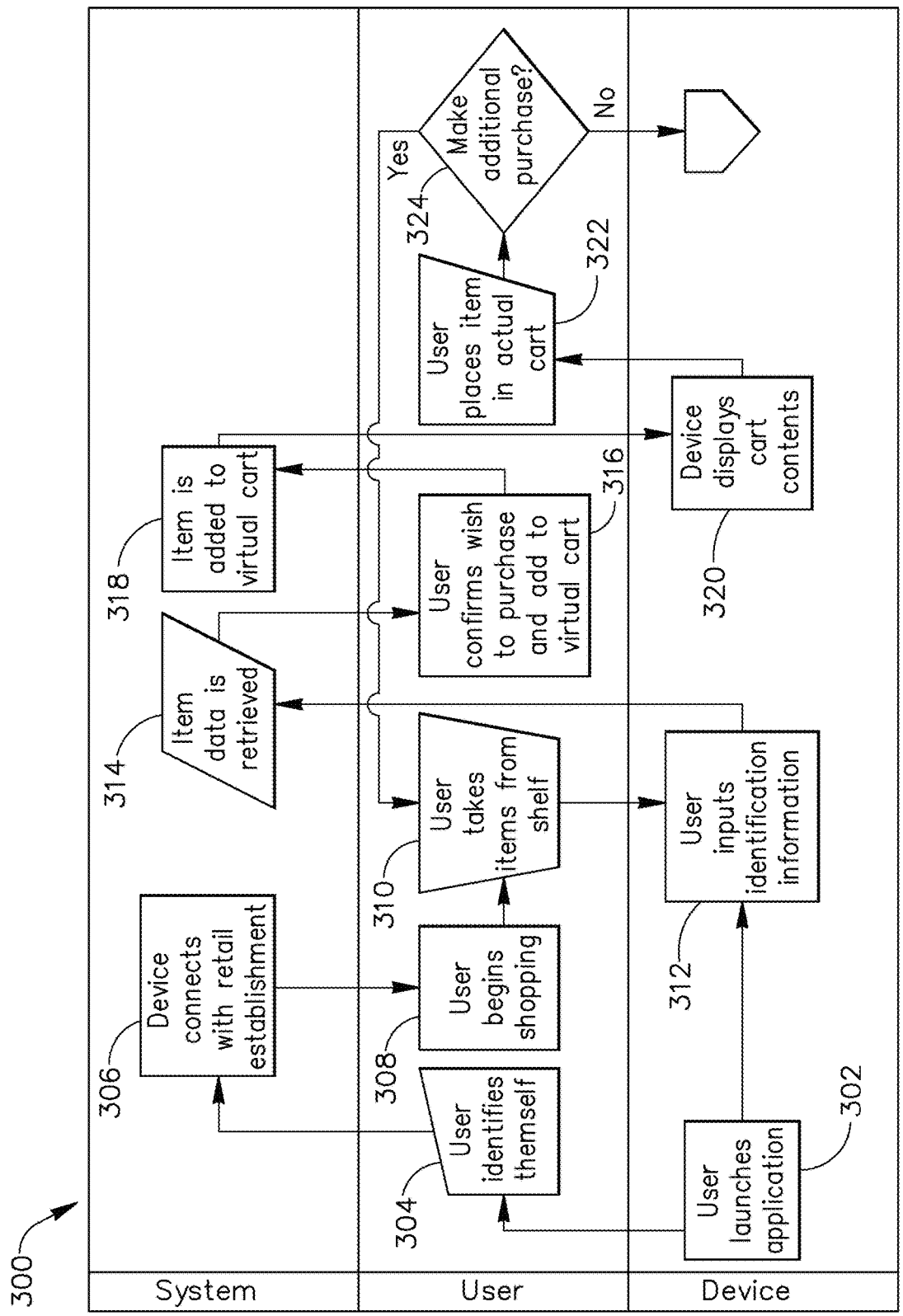
FIGS. 2A and 2B depict flowchart illustrations of methods, apparatus (systems) and computer program products, in accordance with one embodiment of the present invention.
Figure 2B:
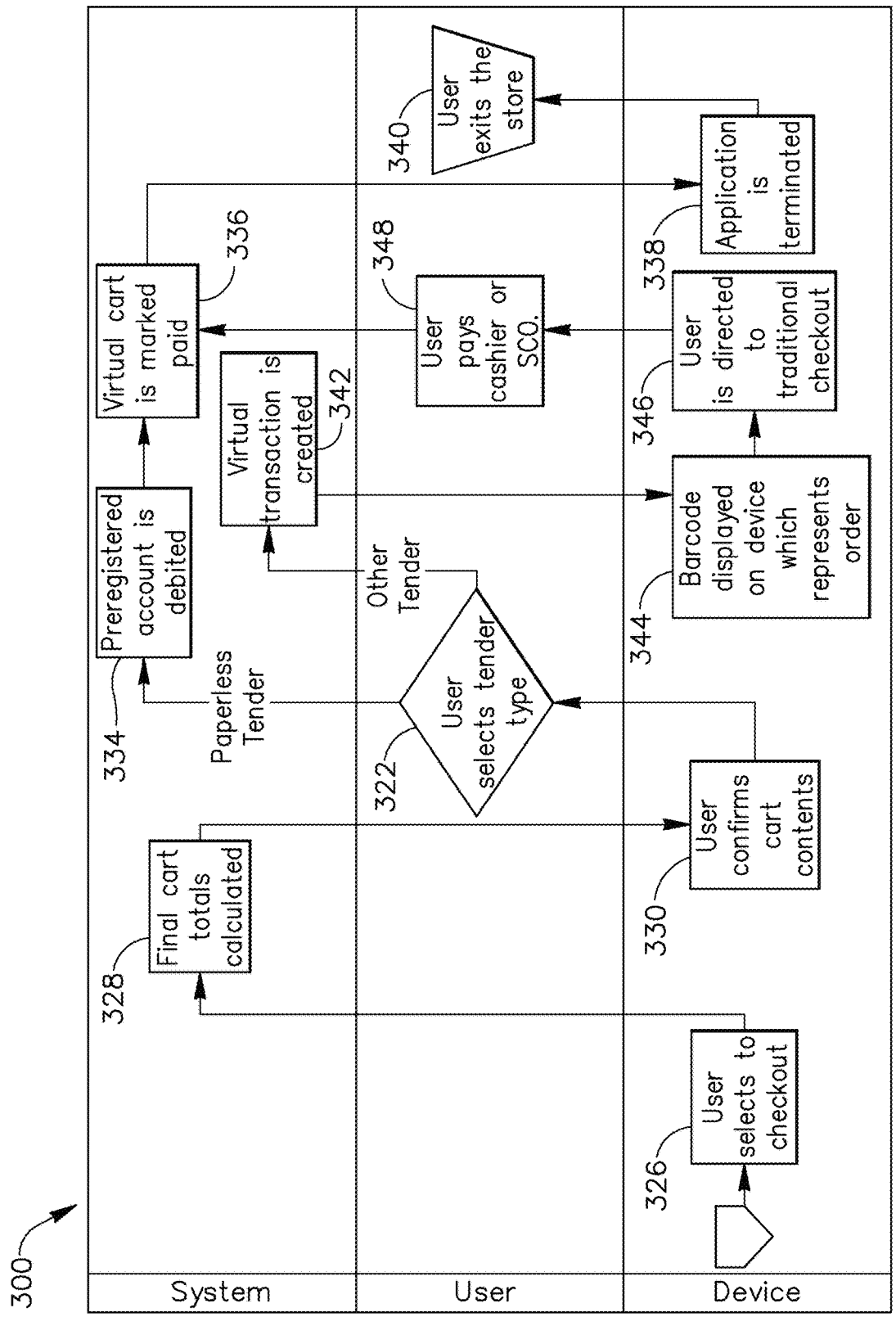

With reference to FIGS. 2A and 2B, in operation, the mobile device 200 is brought into a retail establishment by a customer, or user, and a method 300 for self-checkout with the mobile device 200 is initiated by launching a mobile self-checkout application 400 within the mobile device 200 at block 302. Mobile self-checkout application 400 resides on the mobile device 200 and communicates with a terminal sales application 620 which resides on the server 240. Upon launching the mobile self-checkout application 400, the user may be first prompted to identify himself/herself by entering user identification information into the mobile device 200 via the input means 210. User identification information may include a username, a password, both a username and password. If user is launching the mobile self-checkout application 400 for the first time, the user may be prompted to enter additional user information in addition to user information. Additional user information includes any information which may be used to identify a user, such as user's name, a user's address, a user's telephone number, a user's credit card information or other user financial information, a user's social security number, a user's driver's license number, a user's birthdate, a user's passport number, and other identifying information which may or may not be stored by mobile device 200 or distributed computing system 240.

Figure 3:
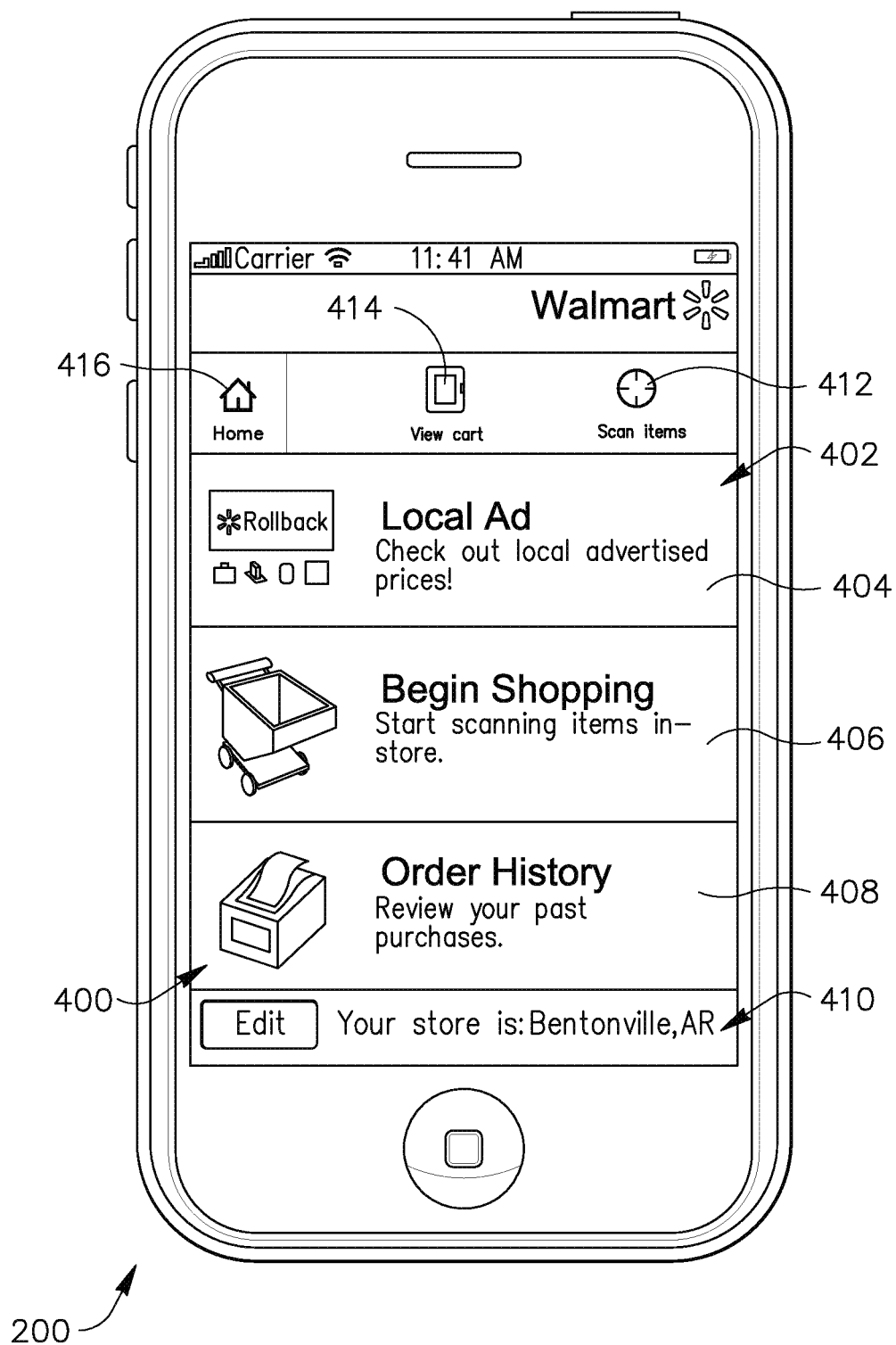
FIGS. 3-18 depict various schematic representations of a mobile self-checkout device running a mobile self-checkout application, in accordance with one embodiment of the present invention.
Figure 18:

Upon identifying the user, the method 300 then moves to block 306 where mobile device 200 is connected with a computer at the retail establishment, such as distributed computing system 240, via network 226. Upon connecting mobile device 200 with distributed computing system 240, the method 300 then moves to block 308 and the user begins shopping at the retail establishment by walking around the retail establishment and looking for items 220 to purchase. With reference to FIGS. 3 and 18, a home screen 402 is presented to the user by the mobile self-checkout application 400 upon launching the mobile self-checkout application 400 and entering user information. In one embodiment, the home screen 402 includes a local ad button 404 which can provide the user with advertisements specific to the retail establishment in which the user is in, a begin shopping button 406 which allows the user to communicate his intention to begin shopping to the mobile self-checkout application 400 and presents the user with a shopping screen 418, and an order history button 408 which allows the user to review past orders, purchases, or past virtual shopping carts. Additionally, the home screen 402 may display store identifying information 410 which provides information that identifies the specific retail establishment in which the user is in, for example, by stating the city and state in which the retail establishment is in or a store number for the retail establishment. Preferably, the mobile device 200 uses the location information processing means to determine the store identifying information 410.

Figure 8:
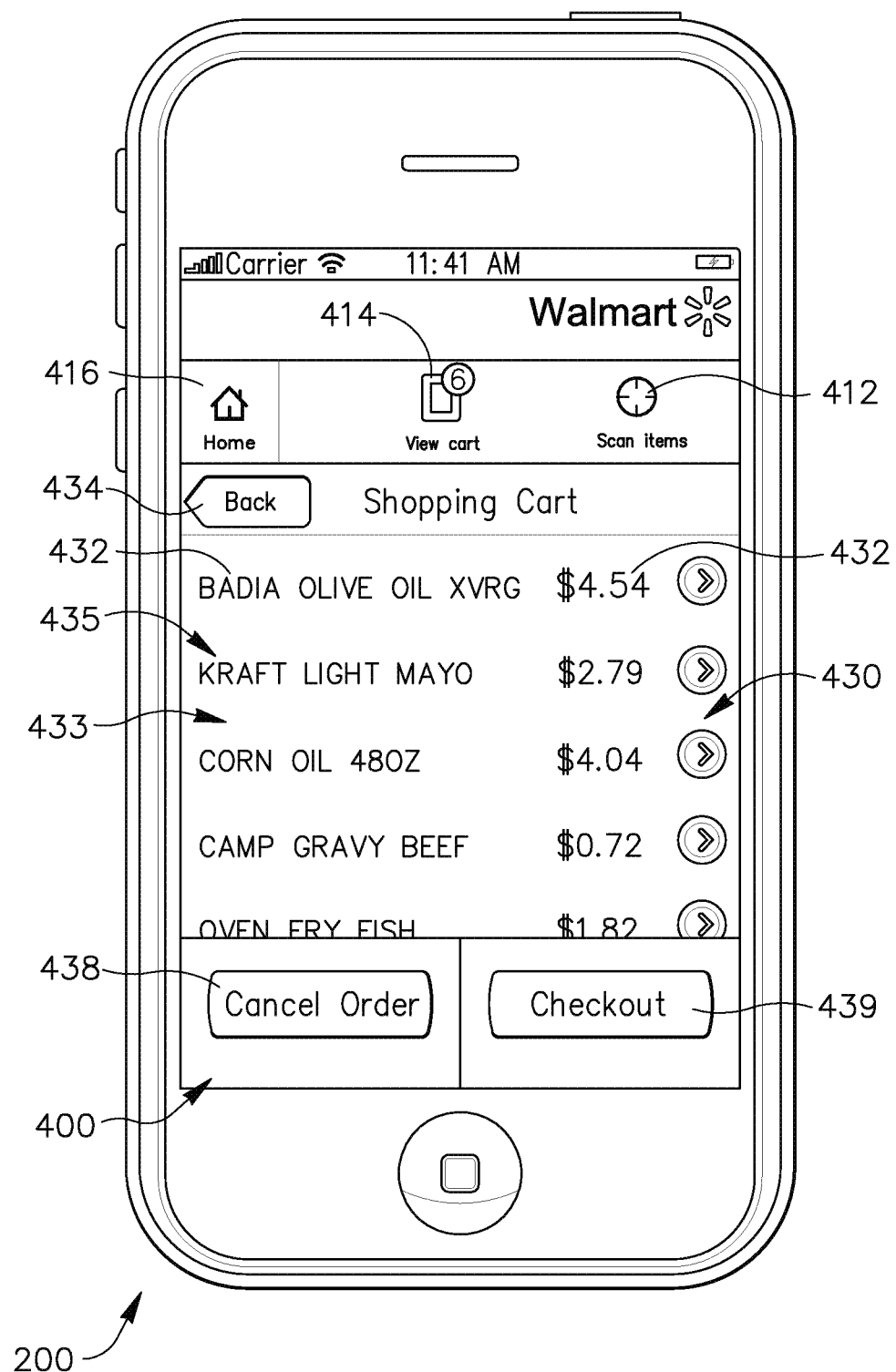

With reference to FIG. 18, in one embodiment, the home screen 402 includes a cart button 403, which when selected, presents the user with a shopping cart screen 430, as shown in FIG. 8. In one embodiment, the home screen 402 includes a help button 405, which when selected, presents the user with a series of help screens which aid the user in using the mobile self-checkout application 400.

Figure 4:
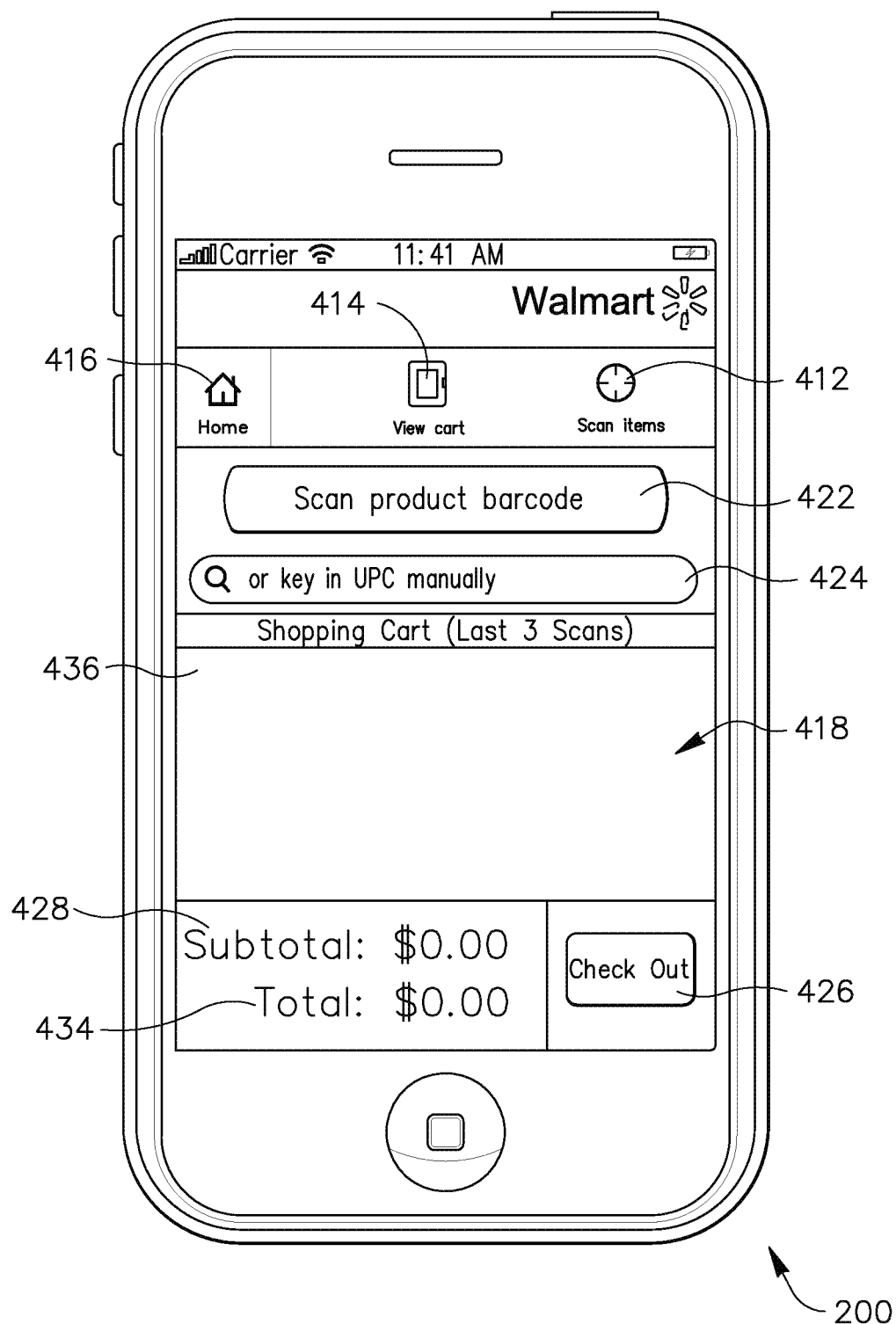
Figure 5:
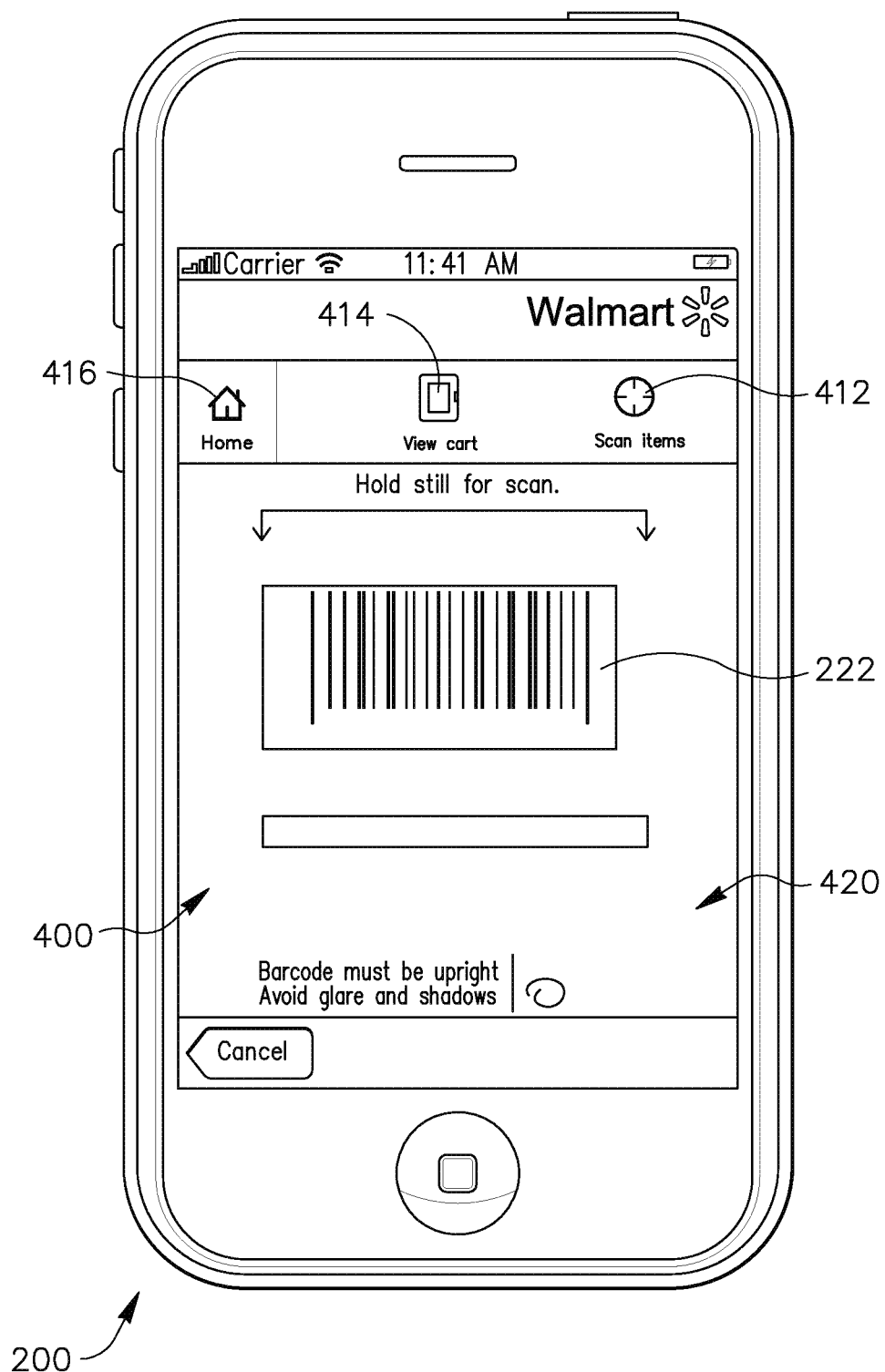

Additionally, mobile self-checkout application 400 includes a scan items button 412, a view cart button 414, and a home button 416. Preferably, buttons 412, 414, and 416 are all present on all or almost all of the screens of the mobile self-checkout application 400, as show in FIGS. 3-15. When selected, the scan items button 412 activates the optical reader 202 and presents the user with a scan items screen 420, as shown in FIG. 5, which allows the user to capture and input identification information 222 from an item 220. When selected, the view cart button 414 presents the user with a shopping cart screen 430, as shown in FIG. 8, which allows the user to view the contents of a virtual shopping cart 433 created by the user and which contains item information 432 representing the item 220. When selected, the home button 416 returns the user to the home screen 402.

Figure 16:
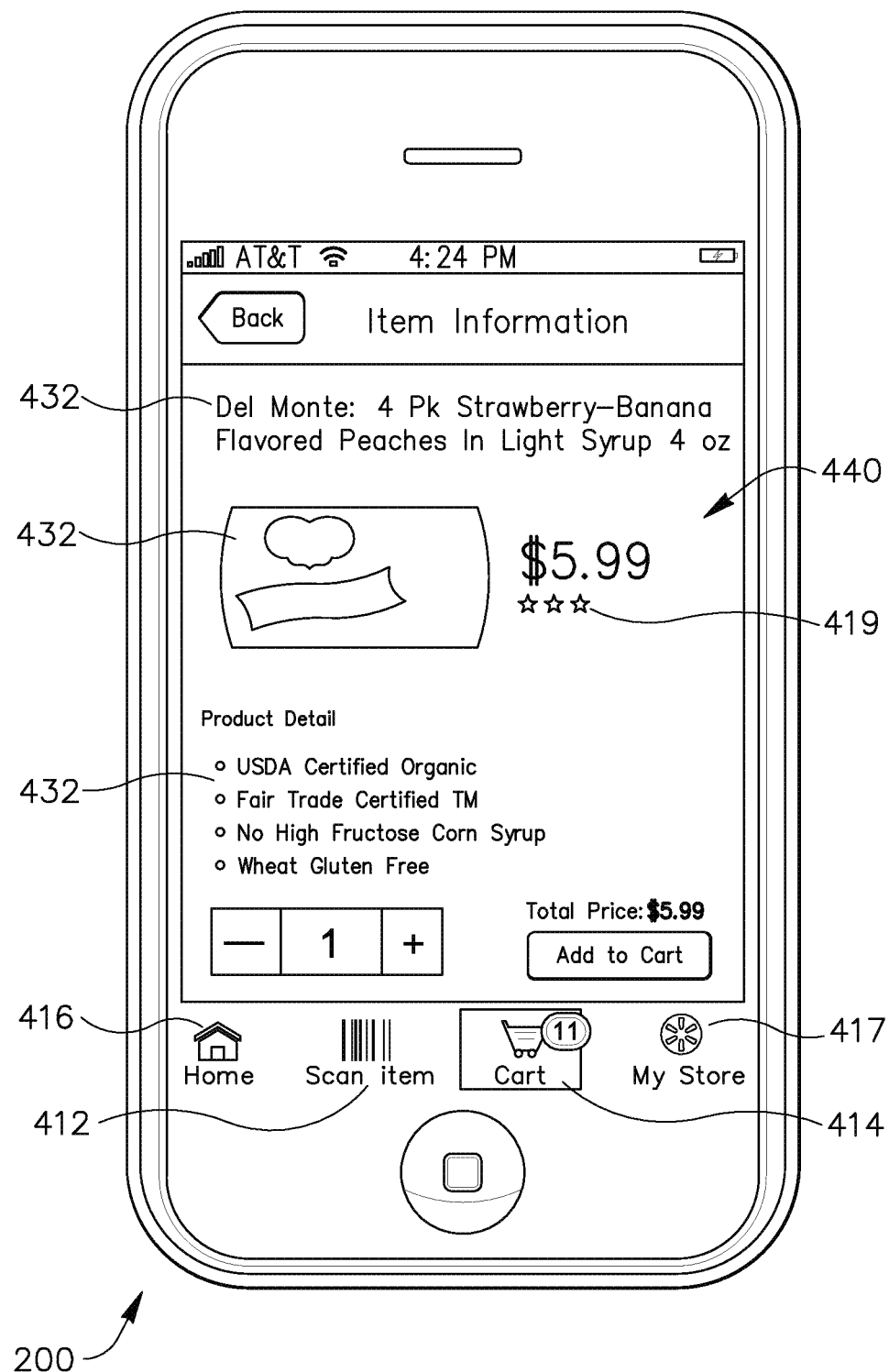

With reference to FIG. 16, in one embodiment, mobile self-checkout application 400 includes a my store button 417 in addition to the scan items button 412, the view cart button 414, and the home button 416. When selected, the my store button 417 presents the user with a store information screen generated by mobile self-checkout application 400 which displays information about the retail establishment that the user is in. Specifically, the store information screen displays information including but not limited to an address of the retail establishment, a phone number of the retail establishment, hours of operation for the retail establishment, services and store number for the retail establishment, and other such information. Preferably, the my store button 417, when selected, also determines the geographic location of the retail location using location information processing means.

Figure 7:
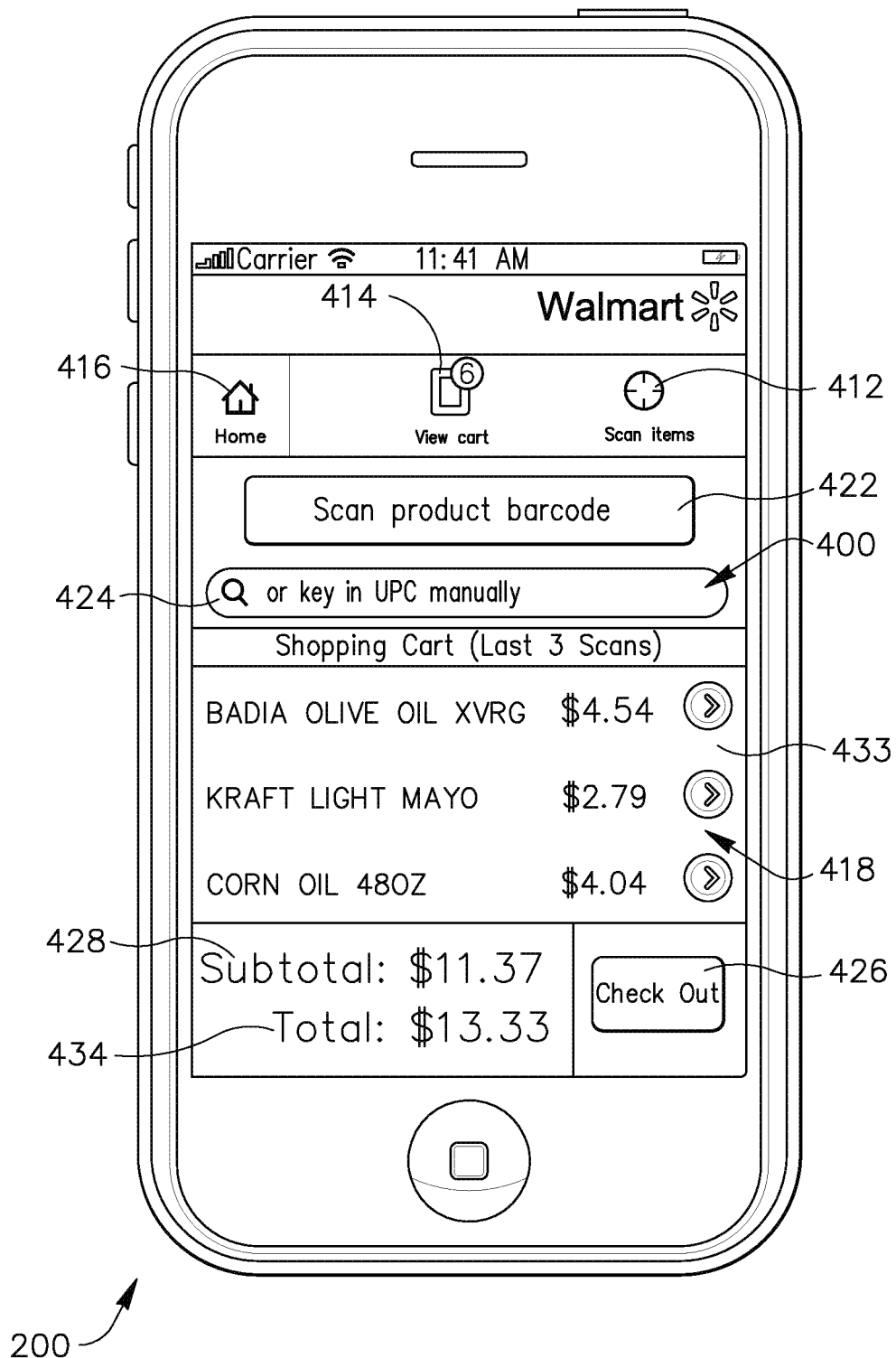
Figure 9:
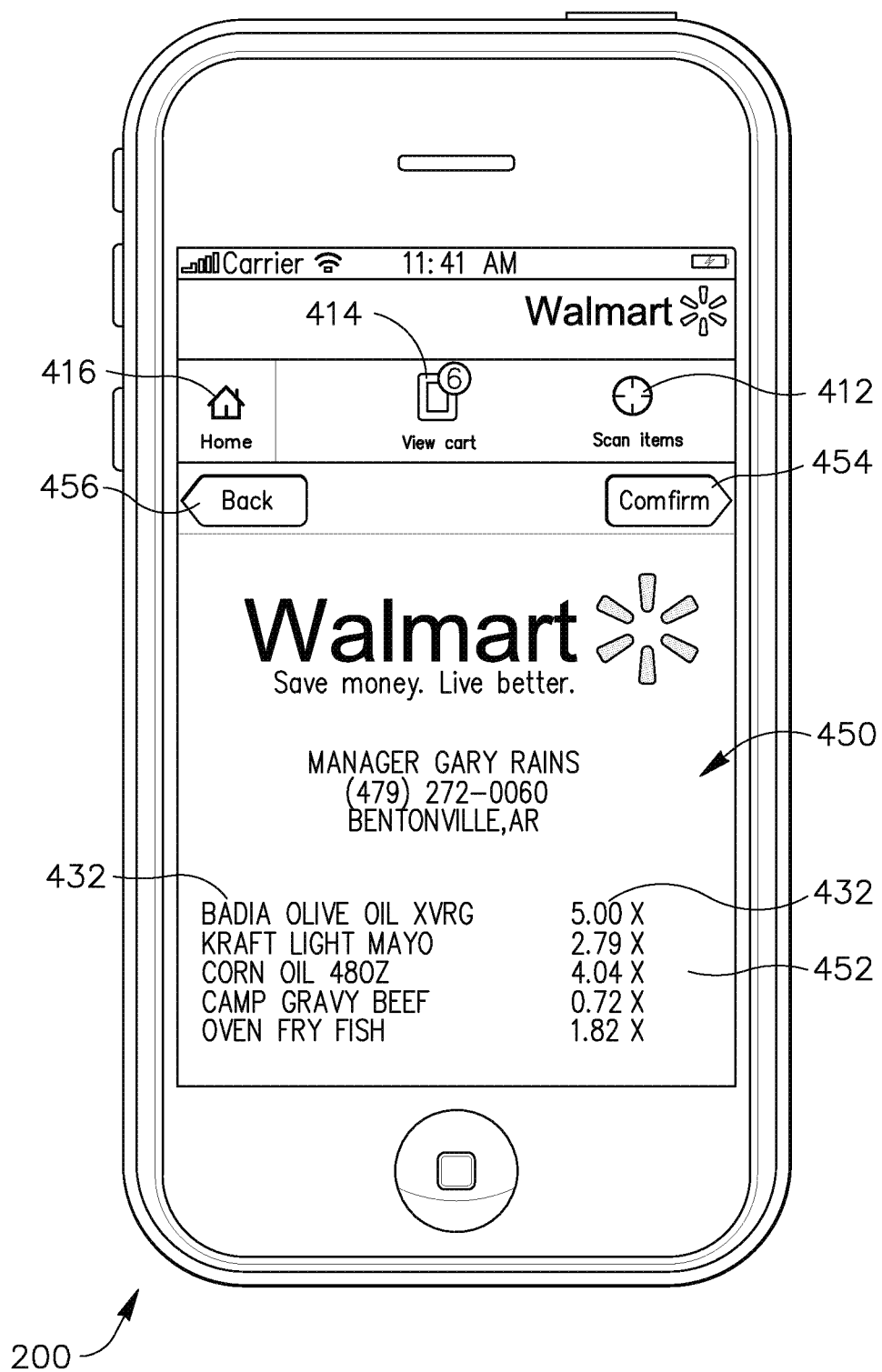

Preferably, once the user has begun shopping at the retail establishment, as shown in block 308, the user communicates his intention to begin shopping to the mobile self-checkout application 400, such as by activating the begin shopping button 406 on the home screen 402. With reference to FIGS. 4 and 7, when selected, the begin shopping button 406 presents the user with a shopping screen 418 having a scan product barcode button 422, a manual identification information box 424, a checkout button 426, subtotal information 428, total information 434, and a partial virtual shopping cart contents window 436. The scan product barcode button 422 activates the optical reader 202 and presents the user with a scan items screen 420, as shown in FIG. 5. The manual identification information box 424 allows a user to manually input identification information 222 into the mobile device 200 which identifies the item 220 for purchase, by inputting, for example, a Universal Product Code (UPC) for the item 220. In one embodiment, UPC information is either manually input or determined automatically from the scan of identification information 222 and then transmitted by mobile device to distributed computing system 240 where a UPC lookup system resides which uses the UPC information to provide the user with item information 432. When selected, the checkout button 426 presents the user with a checkout screen 450, as shown in FIG. 9, which presents the user with the total contents of the virtual shopping cart 433 and the option to confirm the user's intention to purchase those contents. The subtotal information 428 presents the user with a subtotal amount for the contents of the virtual shopping cart 433, and the total information 434 presents the user with a total amount for the contents of the virtual shopping cart 433. The partial virtual shopping cart contents window 436 display a partial view of the contents of the virtual shopping cart 433, such as the last the items entered into the virtual shopping cart 433.

Upon spotting an item to purchase, method 300 then moves to block 310, wherein the user then takes and removes the item 220 from a shelf or stand within the retail establishment. Moving to block 312, the user then inputs identification information 222 into the mobile device 200 which identifies the item 220 for purchase. The identification information 222 can be input manually, such as by entering the information 222 into the identification information box 424, or the identification information 222 can be automatically input by scanning the information 222 using optical reader 202. The user may automatically input identification information 222 by activating optical reader 202. For example user may by activating optical reader 202 by either pressing scan product barcode button 422 or scan items button 412, either of which activates the optical reader 202 and presents the user with a scan items screen 420, as shown in FIG. 5. At scan items screen 420, the user initiates optical reader 202 which then receives identification information 222 from an item 220 and converts the identification information 222 into a format, such as a digital image, so that the processor 201 can read and process the identification information 222. In processing identification information 222, processor 201 may use optical character recognition (OCR) algorithms in order to determine identification information 222 such as a barcode number or a UPC for the item 220.

Upon inputting identification information 222 into the mobile device 200, the identification information 222 is transmitted to the distributed computing system 240 via communications device 208 and received by the distributed computing system 240 at block 314. The distributed computing system 240 may then, at block 314, retrieve item information 432 representing the item 220 using the identification information 222 received from the mobile device 200. The item information 432 may include an item name, an item price, an item review, an item rating, item product details which is a description of the item 220, an image of the item 220, an item tax amount or percentage, or item location information as to where the item 220 is located in the retail establishment.

Figure 6:
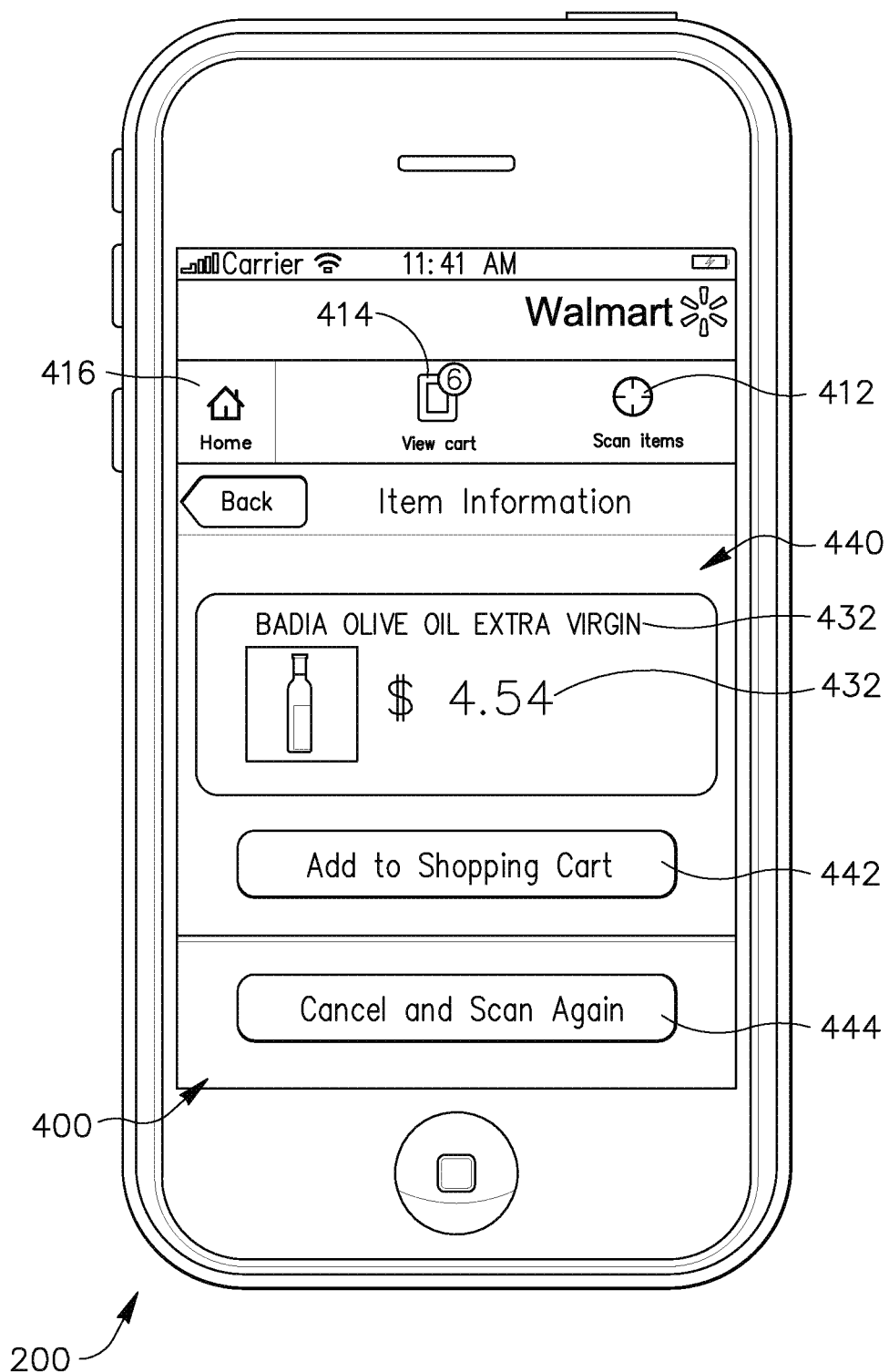
Figure 12:
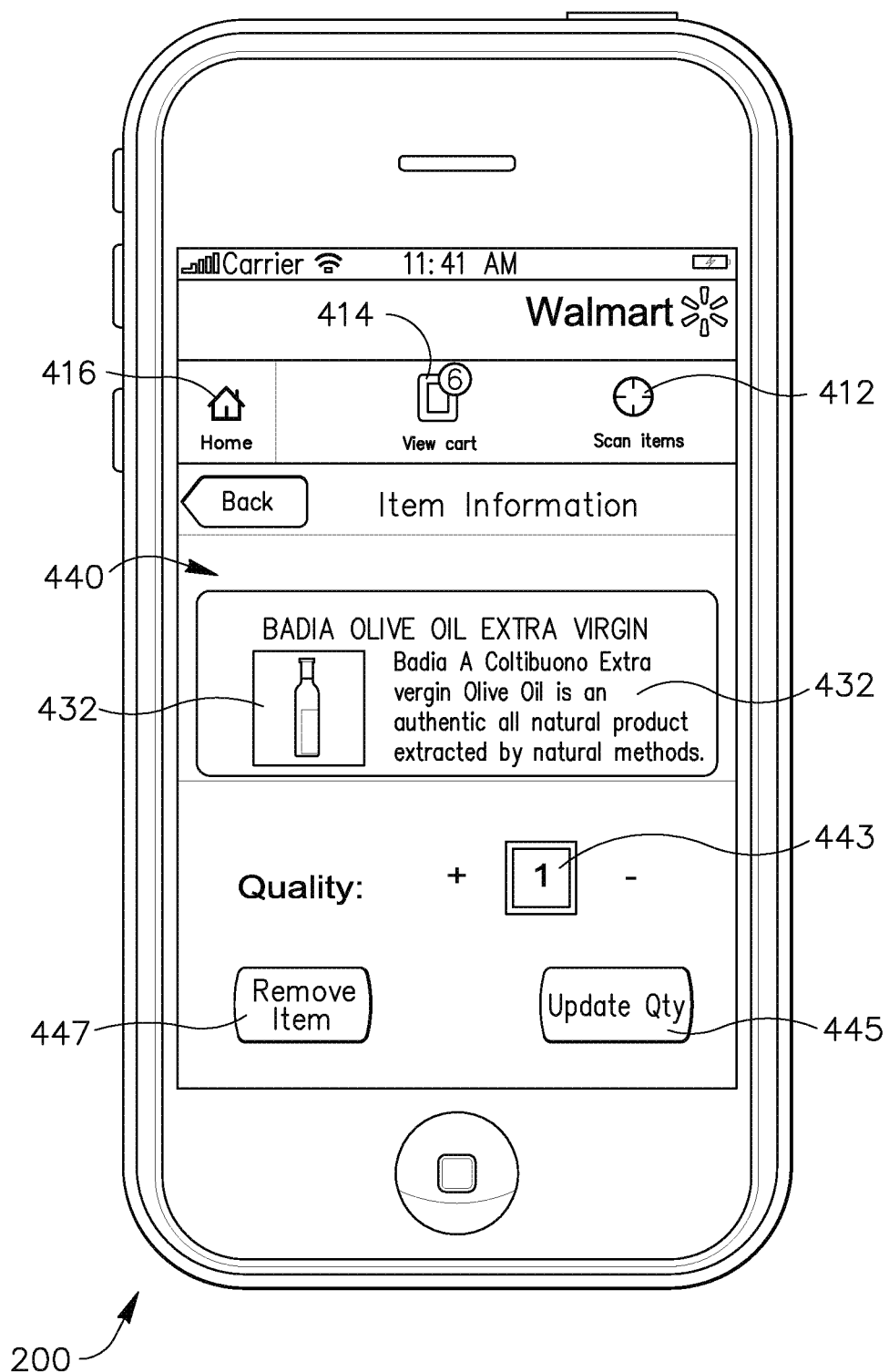

Upon retrieving item information 432, the distributed computing system 240 may then transmit the retrieved item information 432 to the mobile device, whereupon mobile self-checkout application 400 may present the user with an item information screen 440 which displays item information 432 for item 220, as shown in FIGS. 6 and 12. In one embodiment, the user may be prompted to confirm that the item information 432 is related to the item 220 for purchase. Moving to block 316, the user may also be prompted to confirm the user's intent to purchase an item identified by item information 222. For example, the item information 222 may be for an item which is not item 220 selected by the user. In this case the user can inform the mobile self-checkout application 400 that the item information 222 is not accurate or does not relate to item 220.

Figure 13:
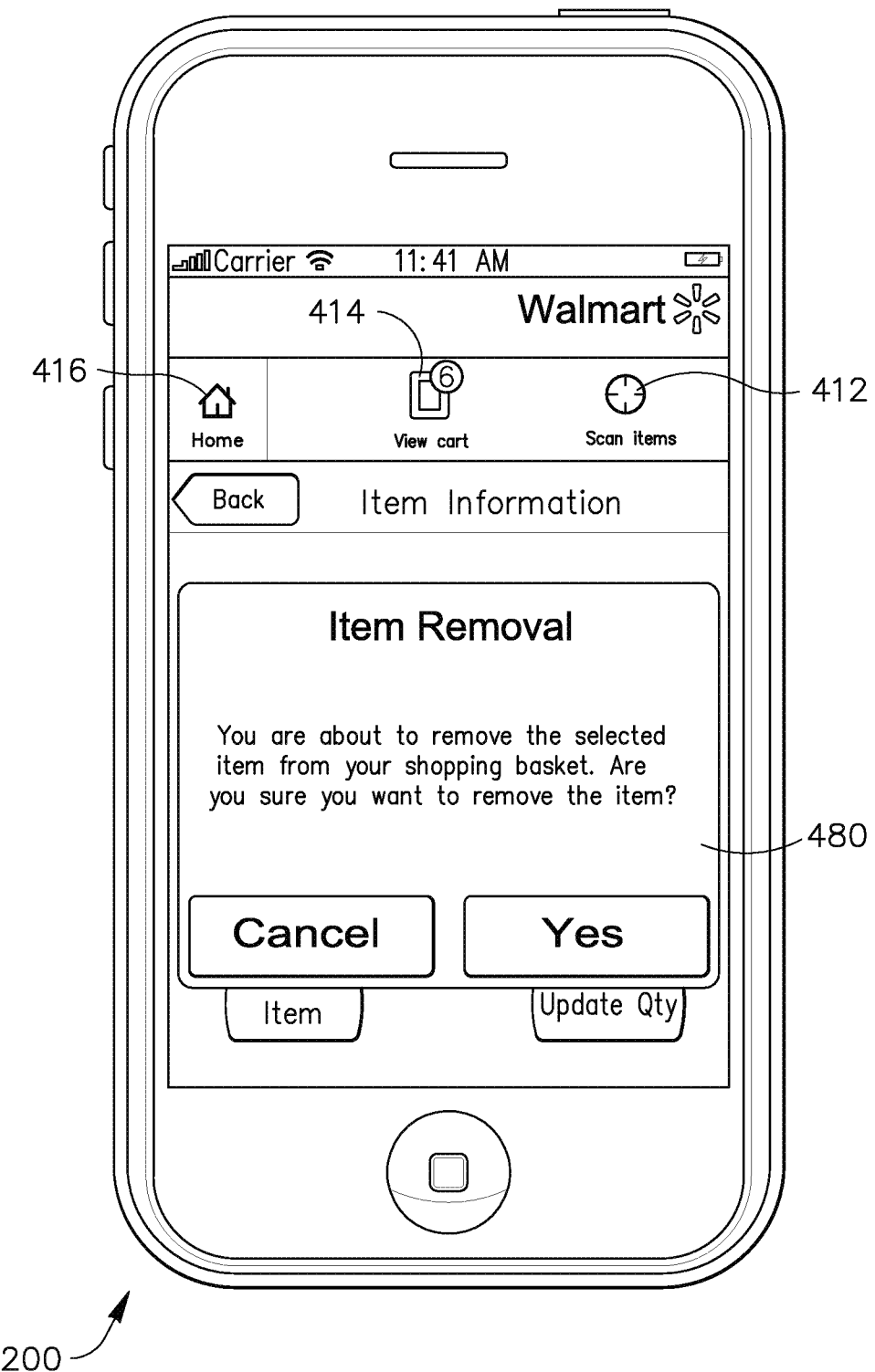

With reference to FIGS. 6 and 12, in one embodiment, item information screen 440 provides the user with an add to shopping cart button 442 or a quantity select button 443 which when selected, generates a virtual shopping cart 433 containing item information 432 representing the item 220. The quantity select button 443 allows the user to add more than one item 220 in the virtual shopping cart 433 and then an update quantity button 445 allows the user to update the quantity of item 220 indicated by the virtual shopping cart 433. Additionally, the user may also be provided with a cancel and scan again button 444, which when selected, does not add item information 432 to a virtual shopping cart 433 and provides the user with the scan items screen 420 again. In one embodiment, a remove item button 447 is provided to the user, which when selected, removes the any item information 222 for item 220 from the virtual shopping cart 433. With reference to FIG. 13, if the remove item button 447 is selected, the user may be prompted with an item removal confirmation screen 480 which prompts the user to confirm his/her desire to remove item 220 along with item information 222 from virtual shopping cart 433.

With reference to FIG. 16, in one embodiment, item information screen 440 provides the user with the option 419 to rate the item 220 and read reviews from other users for the item 220. In one embodiment, mobile self-checkout application 400 provides the user with the option to provide stock information to the distributed computing system 240 indicating whether or not item 220 is in stock at the retail establishment.

If the user confirms his/her intent to purchase item 220, a virtual shopping cart 433 containing item information 432 representing the item 220 is then generated at block 318. In one embodiment, the virtual shopping cart 433 is generated by the mobile device 200 and then transmitted to the distributed computing system 240. In another embodiment, the virtual shopping cart 433 is generated by the distributed computing system 240 and specifically, generated by the terminal sales application 620. Preferably, the virtual shopping cart 433 is generated by the distributed computing system 240, specifically generated by the terminal sales application 620, stored on the distributed computing system, and transmitted to the mobile device 200 for display to the user via display 206. Preferably, any contents in the virtual shopping cart 433, which represent items 220, are kept in the virtual shopping cart 433 for a predefined period of time, after which the contents are deleted. If the method 300, and the shopping process, is interrupted for any reason (for example a phone call is received by the mobile device 200, a text message is received by the mobile device 200, the user wishes to perform another function with the mobile device 200, etc.) the user can resume the method 300 and continue using the virtual shopping cart 433 representing the already selected items 220 for a predefined period of time. In one embodiment, mobile self-checkout application 400 provides the user with the option to create and save a shopping list having all the items 220 represented in the virtual shopping cart 433. The shopping list can be created any place, such as a user's home. When using the shopping list in a retail establishment as part of method 300, items 220 may be paired up and removed from the shopping list and then added to the virtual shopping cart 433.

In one embodiment, upon retrieving item information 432, the distributed computing system 240 may then transmit the retrieved item information 432 to the mobile device, whereupon mobile self-checkout application 400 may automatically generate a virtual shopping cart 433 containing item information 432 representing the item 220. Additionally, in one embodiment, upon retrieving item information 432, the distributed computing system 240 may automatically generate a virtual shopping cart 433 containing item information 432 representing the item 220 and transmit that shopping cart along with its contents to the mobile device 200 for display to the user.

Upon generating a virtual shopping cart 433 containing item information 432 representing the item 220 and transmitting that information between the mobile device 200 and the distributed computing system 240, the mobile device 200 then displays a virtual shopping cart 433 along with all of its contents 435 to the user at block 320. In one embodiment, the mobile self-checkout application 400 presents the user with the shopping cart screen 430, as shown in FIG. 8, displaying the contents of the virtual shopping cart 433 to the user using item information 432.

Figure 15:
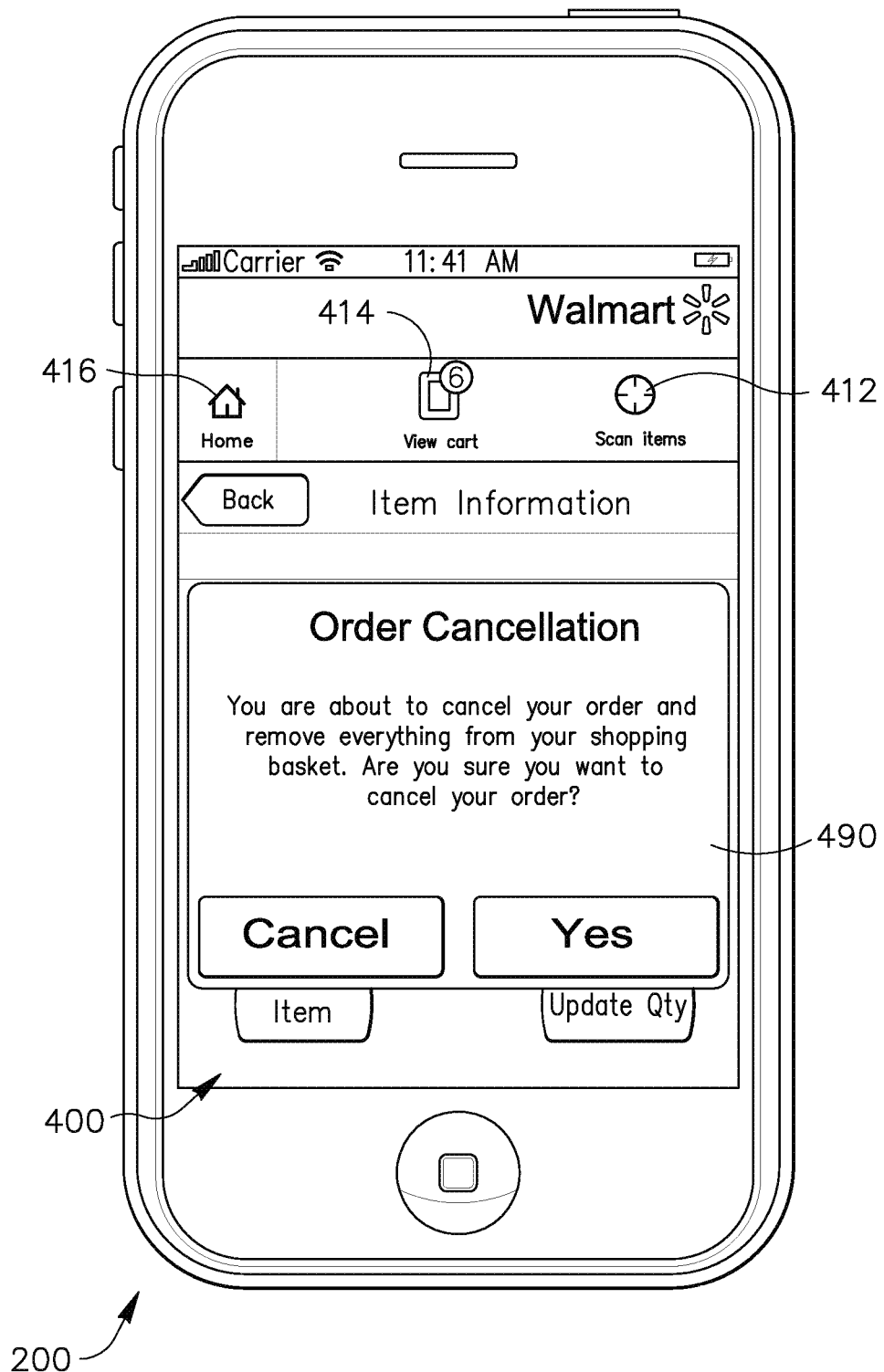
Figure 17:
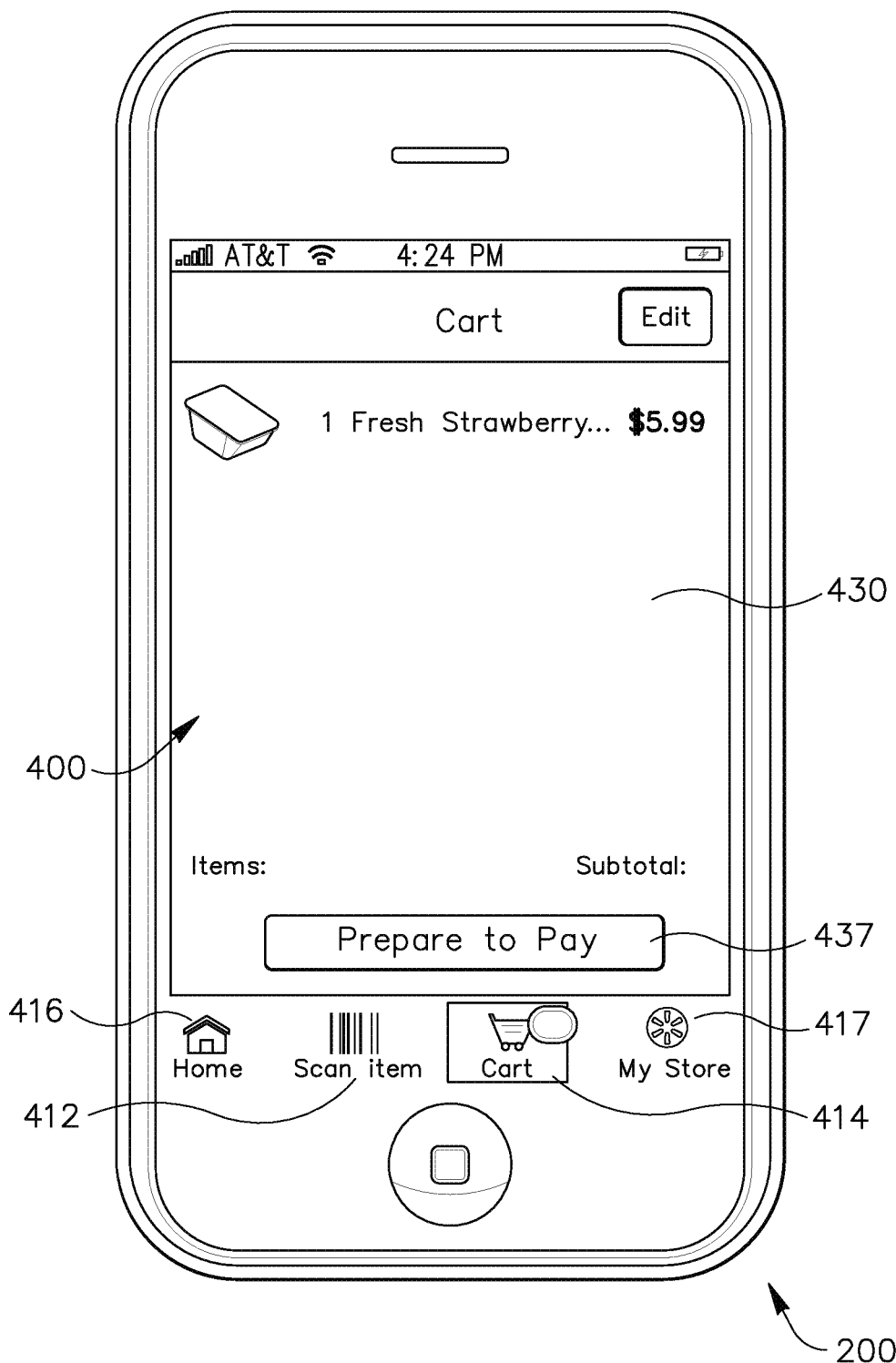

With reference to FIGS. 8 and 17, the shopping cart screen 430 may present the user with the option to purchase the item 220 represented by item information 432 in the virtual shopping cart 433 by pressing a checkout button 439 or a prepare to pay button 437. The shopping cart screen 430 may present the user with the option to continue shopping by pressing a back button 434, wherein the user is presented with the shopping screen 418 again. The shopping cart screen 430 may also present the user with the option to cancel an order 452 altogether by pressing a cancel order button 438, wherein the contents of the virtual shopping cart 433 are emptied and the user is presented with either the shopping screen 418 or the home screen 402 again. With reference to FIG. 15, in one embodiment, when the cancel order button 438 is selected, the user may be prompted with an order cancellation screen 490 which prompts the user to confirm his/her desire to cancel order 452 and empty the virtual shopping cart 433.

As used herein, an order 452 is any request to purchase an item 220. Order 452 is comprised of information received from the mobile self-checkout program 400, such as identification information 222, quantity information indicating how many units of a particular item 220 in the virtual shopping cart 433 a user would like to purchase, user identification information, additional user information, an order number 463, and store identifying information 410 which provides information that identifies the specific retail establishment in which the user is in.

Figure 14:
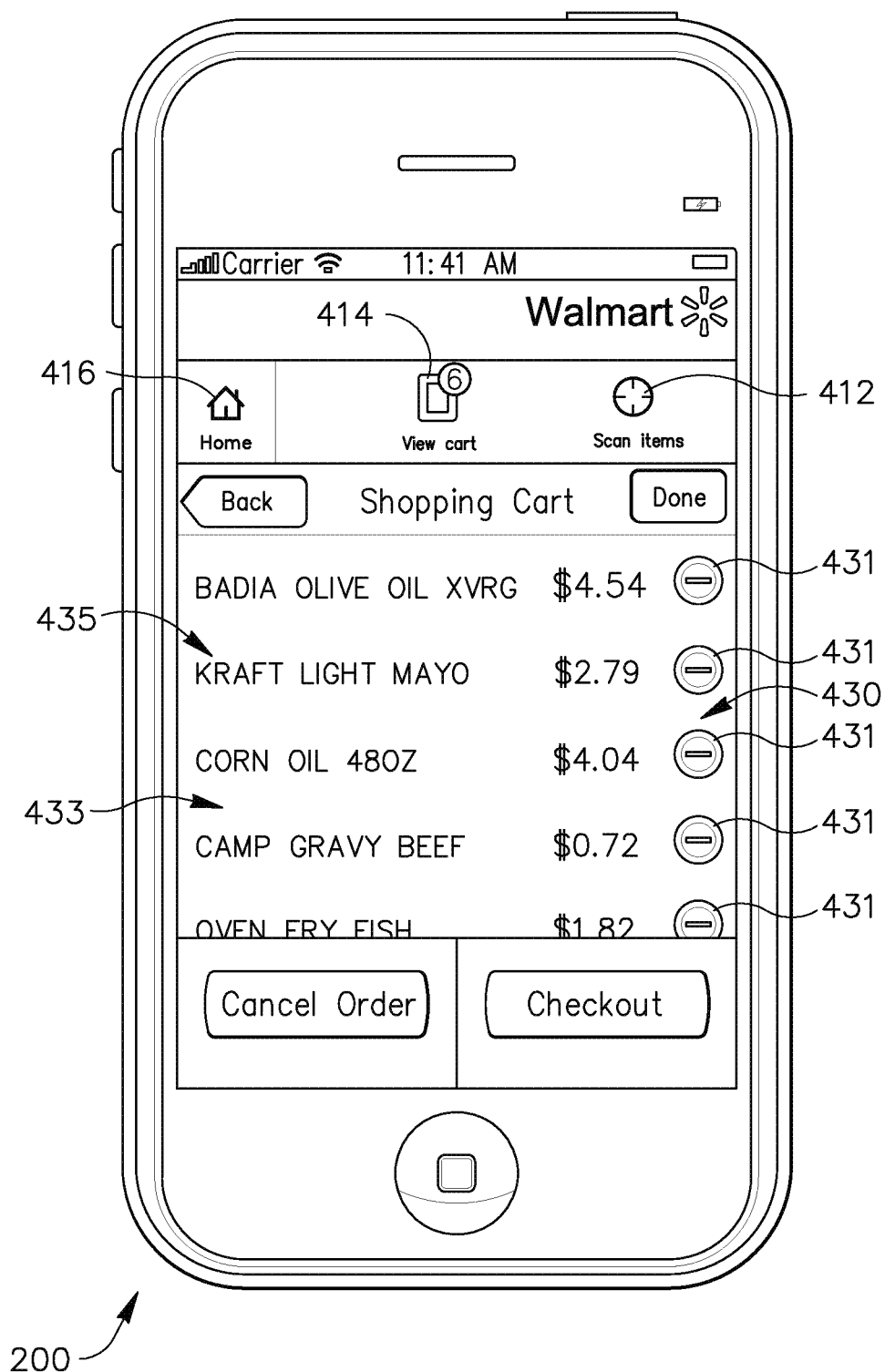

With reference to FIG. 14, in one embodiment, the shopping cart screen 430 includes an item removal button 431 associated with each item 220 represented in the virtual shopping cart 433. When the item removal button 431 is selected, the user may be prompted with item removal confirmation screen 480 which prompts the user to confirm his/her desire to remove item 220 along with item information 222 from virtual shopping cart 433, as shown in FIG. 13.

Upon displaying the contents of the virtual shopping cart 433 to the user at block 320, the user then places the item 220 in an actual shopping cart at block 322. The user is then prompted by the mobile self-checkout application 400 at block 324 and asked if the user would like to continue shopping and purchases additional items 220 or not. In one embodiment, the user is presented with checkout button 439, back button 434, and/or cancel order button 438. If the user wishes to continue shopping, method 300 moves back to block 310. If the user does not wish to continue shopping, method 300 moves to block 326, wherein the user selects the option of checking out, using for example checkout button 439. In one embodiment, instead of pressing a button, such as checkout button 439, back button 434, and/or cancel order button 438, the user may make a hand gesture, a swipe, or other such gesture to activate a feature of mobile self-checkout application 400.

Upon selecting the option to checkout, a total amount for all the contents of the virtual shopping cart 433 is calculated and an order 452 is generated for the item 220 identified by the identification information 222, listed in the virtual shopping cart 433 at block 328. Preferably, an order number 463 associated with the order 452 is also generated. In one embodiment, the order 452 is generated by the mobile device 200 and transmitted to the distributed computing system 240, in another embodiment the order 452 is generated by the distributed computing system 240 and then transmitted to the mobile device 200 for confirmation by the user. Upon generating the order 452 at block 328, the user is then presented with the order 452 at block 330 and asked to confirm the accuracy of the order 452. Preferably, an order confirmation screen 450 is generated by the mobile self-checkout application 400, as shown in FIG. 9. The order confirmation screen 450 includes a confirm button 454 which allows the user to confirm the accuracy of the order 452 and the user's intent to purchase the items 220 identified in the order 452 via identification information 432. The order confirmation screen 450 also includes a back button 456 which when pressed allows to user to go back to the shopping cart screen 430.

Upon confirming a user's intent to purchase items 220 identified by item information 432, method 300 then moves to block 332 wherein the user selects the type of tender and the payment method used to pay for the order 452 which was generated. The user has the choice of providing a variety of types of tender, such as cash, credit card, direct debit from a bank, payment using an online payment service such as PayPal™ or Google Checkout, a gift card, store credit, personal check, money order, or other payment means. The user also has the choice of payment method, either transmitting payment via the mobile device 200 using mobile self-checkout application 400 or providing payment at either a traditional cashier or self-checkout station.

If the user decides to provide payment for order 452 using a traditional cashier or self-checkout station, which may occur when the user wishes to pay with cash, then a virtual transaction is created at block 342 and an optical machine-readable representation 460 of the order 452 which identifies the order 452 is generated and displayed on the display 206 of the mobile device 200 at block 344. The optical machine-readable representation 460 encodes a unique identifier 462 such as an order number 463 or a unique mobile identifier (UMI) which is associated with the mobile device 200 in order to identify order 452, since each optical machine-readable representation 460 generated is unique to each order 452. Each unique mobile identifier (UMI) is specific to a particular mobile device 200, and contains information identifying that particular mobile device 200, such as unique device identifier (UDID) for the mobile device 200, a serial number of the mobile device 200, or some other identifying information for a particular mobile device 200.

The optical machine-readable representation 460 of the order 452 represents the order 452 and encodes identifying information or a unique identifier 462, which includes things such as: an order number 463; customer identifying information which can be used to identify a customer, such as a customer name, a customer number, and a social security number; transaction identifying information which can be used to identify a specific transaction, such as a number or other alphanumeric code; device identifying information that can identify a specific device such as a serial number or a unique device identifier (UDID) for a device such as a mobile phone or mobile computer; and any alphanumeric code or any symbol which may be used associated with and used to identify and retrieve a specific order 452. Preferably, an order number 463 along with the optical machine-readable representation 460 of the order 452 is displayed on the display 206 of the mobile device 200.

The optical machine-readable representation 460 of the order 452 is encoded in such a manner as to allow an optical scanning machine 500, such as barcode reader, to read the optical machine-readable representation 460. A barcode reader, or barcode scanner, is an electronic device for reading printed barcodes. Like a flatbed scanner, a barcode reader consists of a light source, a lens, and a light sensor translating optical impulses into electrical ones. As a result, the optical machine-readable representation 460 of the order 452 is preferably in a form of barcode, such as a linear or 1D barcode, or a matrix 2D barcode, allowing for a standard barcode reader to read and convert the optical machine-readable representation 460 into digital data which any computer can read. In one embodiment, the optical machine-readable representation 460 of the order 452 is preferably in a form of 1D barcode, such as a 1D barcode having one of the following formats: UPC-A, UPC-E, EAN-13, EAN-8, Code-128, Code-39 and ITF.

Figure 10:
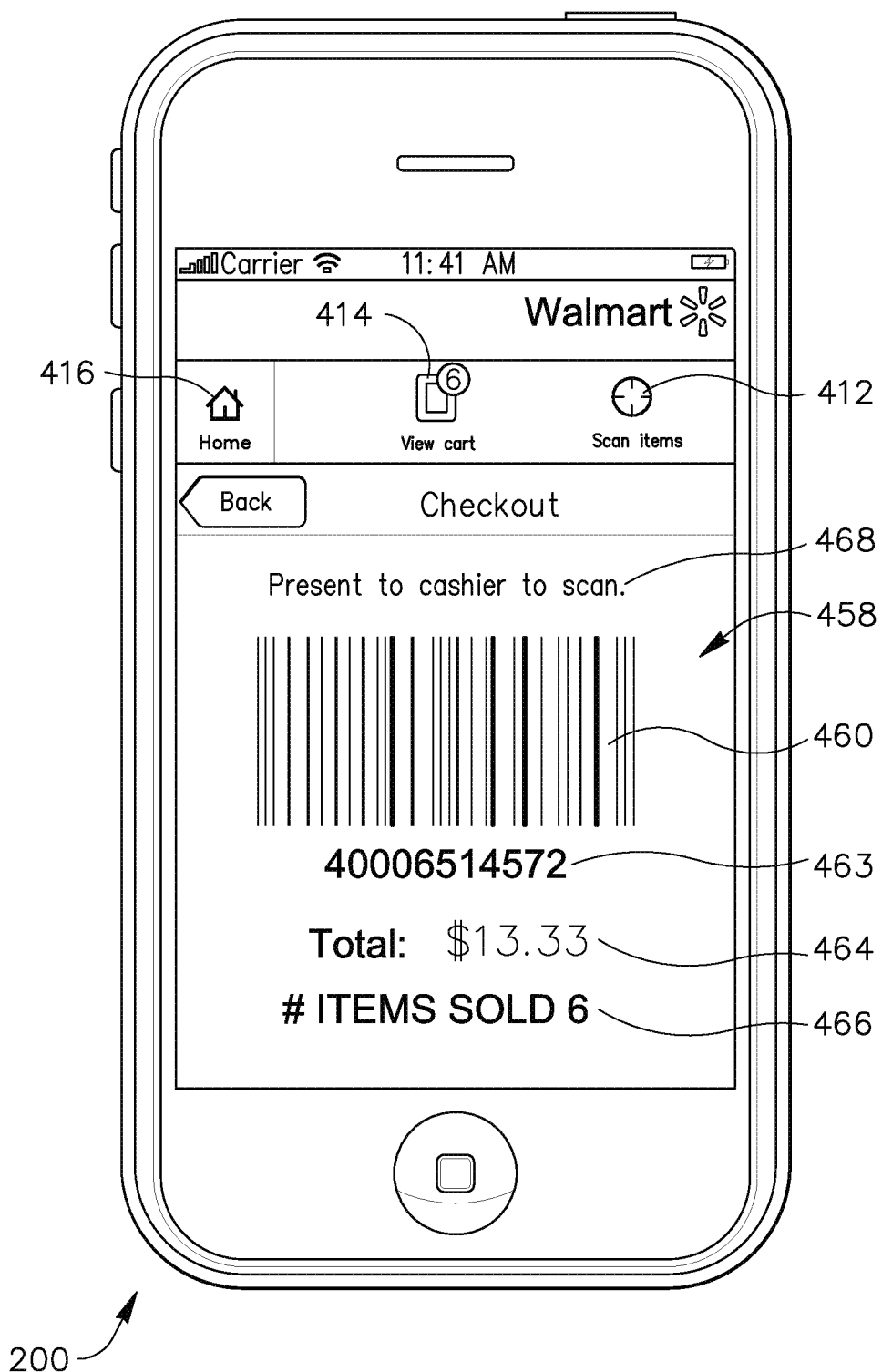
Figure 11:
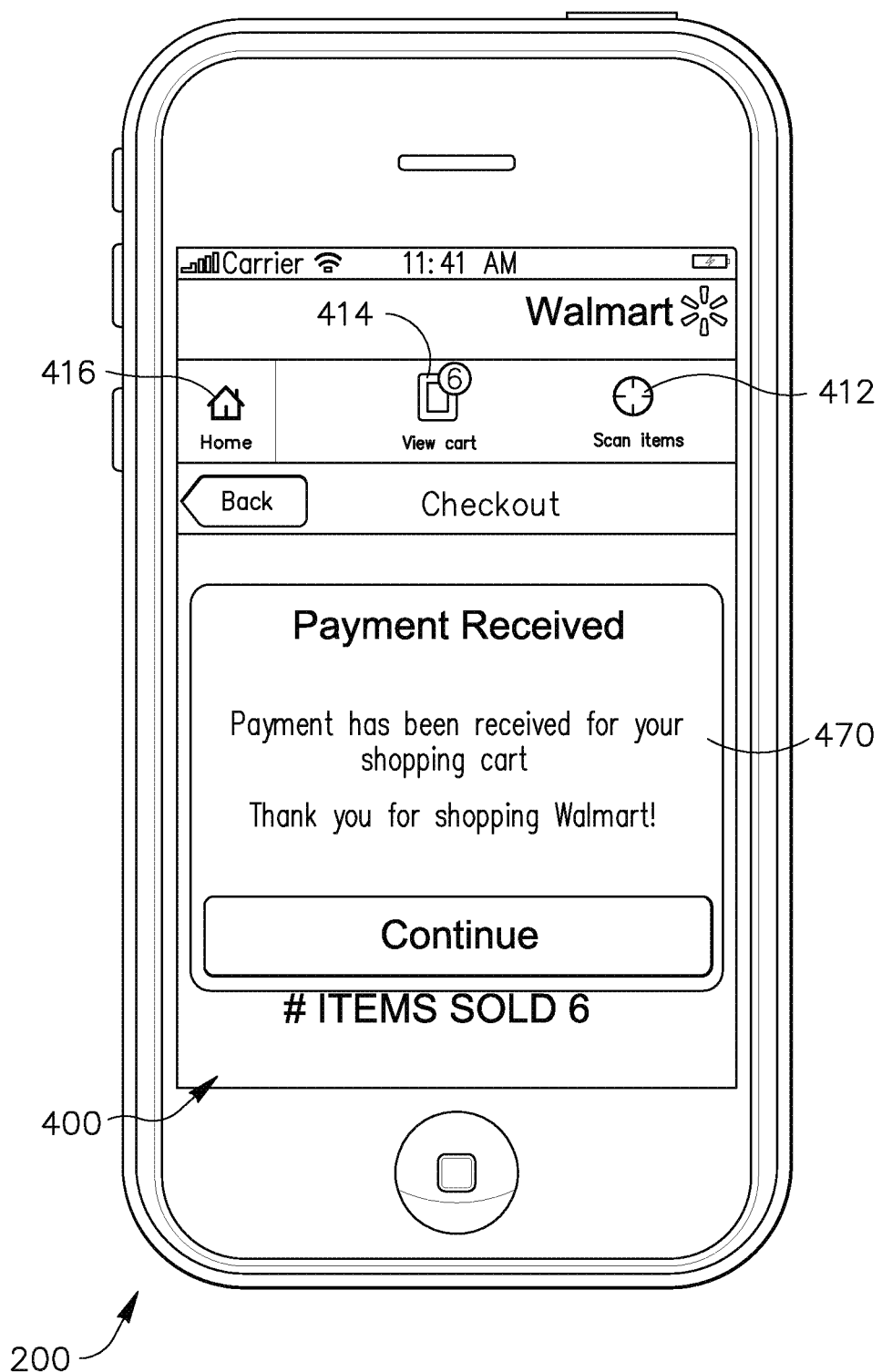

Preferably, upon generating the optical machine-readable representation 460 of the order 452, a machine-readable representation screen 458 is generated by the mobile self-checkout application 400, as shown in FIG. 10. The machine-readable representation screen 458 includes an order number 463 along with the optical machine-readable representation 460 of the order 452, a total payment amount 464 for all the items 220 ordered, and a total amount 466 of items 220 sold. The user is directed by the mobile self-checkout application 400 to present the optical machine-readable representation 460 to a cashier to scan in order to complete a checkout process via message 468 on machine-readable representation screen 458 at block 346. In one embodiment, a unique identifier 462 is provided to the user and displayed on display 206, either alone or printed below the optical machine-readable representation 460. In this embodiment, the user may manually input or key in the unique identifier 462 at a point of sale terminal 600 or provide the unique identifier 462 to a cashier who then can manually enter the unique identifier 462 at the point-of-sale terminal 600.

Figure 1C:
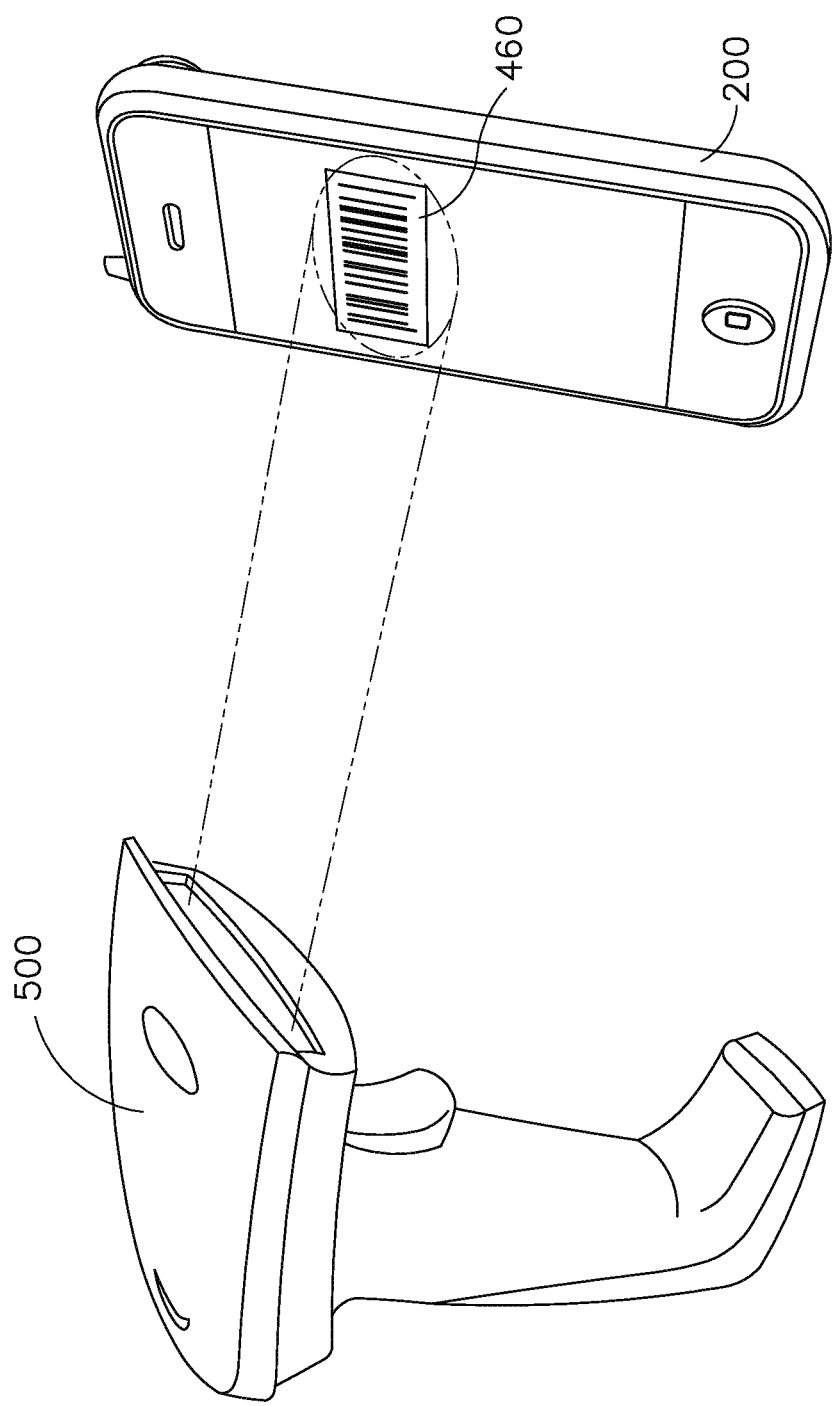
FIG. 1C depicts an illustration of an optical scanning machine reading an optical machine-readable representation of an order display on a mobile device, in accordance with one embodiment of the present invention.

With reference to FIGS. 1C and 2B, at block 348, the user goes to a traditional cashier or a self-checkout station and presents the optical machine-readable representation 460 to an optical scanning machine 500 which reads the optical machine-readable representation 460, and specifically the unique identifier 462 encoded in the optical machine-readable representation 460. Preferably, the unique identifier 462 is then transmitted to distributed computing system 240 in order to retrieve the order 452 from the distributed computing system 240. Order 452, along with the total payment amount 464, is then transmitted from the distributed computing system 240 to a cash register or other computer operable by the traditional cashier or the self-checkout station. Moving to block 348, the user is then prompted by either the traditional cashier or the self-checkout station to tender payment for the total payment amount 464, whereupon the user then tenders payment to either the traditional cashier or the self-checkout station for the total payment amount 464.

Moving the block 336, upon the user tendering payment, payment information is generated by the cash register or other computer operated by the traditional cashier, or by the self-checkout station and then transmitted to the distributed computing system 240, whereupon the virtual shopping cart 433 is then marked paid and a receipt is generated by the distributed computing system 240, the traditional cashier, and/or the self-checkout station. The receipt is then provided to the user.

Preferably, an acknowledgment that payment has been received is sent to the mobile device 200 from the distributed computing system 240 and displayed to the user via a payment received screen 458 which is generated by the mobile self-checkout application 400, as shown in FIG. 10. In one embodiment, a digital copy of the receipt is transmitted to the user from the distributed computing system 240. Preferably, the digital copy of the receipt is transmitted from the distributed computing system 240 to the mobile device 200 and displayed via the mobile self-checkout application 400. In one embodiment, the digital copy of the receipt is transmitted from the distributed computing system 240 in an email to an email address of the user. Preferably, upon generating and sending an acknowledgment that payment has been received, the server 240 then changes the current virtual shopping cart into a past virtual shopping cart, retrievable by the user via the order history button 408. Sales transaction and receipt information is stored on the distributed computing system 240 and is thus accessible for a variety of purposes: including but not limited to: asset protection solutions, return validation, customer reference, and the like.

If at block 332 the user decides to provide payment for order 452 by transmitting payment via the mobile device 200 using mobile self-checkout application 400, then application 400 either debits a preregistered payment account of the user's or the user is prompted for payment account information. If the user has already created a preregistered payment account with mobile self-checkout application 400, by already entering payment account information which could include, credit card information, online payment service information such as a user account name and password, store credit information, or gift card information, then mobile self-checkout application 400 debits the preregistered account at block 334. If the user has not already created a preregistered payment account with mobile self-checkout application 400, the user is prompted to create a payment account by providing payment account information. Upon creating the payment account, the mobile self-checkout application 400 then debits the payment account for the total payment amount 464. Upon debiting either the preregistered payment account or the just created payment account, the method 300 then moves to block 336, whereupon the whereupon the virtual shopping cart 433 is then marked paid and a receipt is generated by the distributed computing system 240, the traditional cashier, and/or the self-checkout station. The receipt is then provided to the user. Sales transaction and receipt information is stored on the distributed computing system 240 and is thus accessible for a variety of purposes: including but not limited to: asset protection solutions, return validation, customer reference, and the like.

Moving to block 338, upon marking that the virtual shopping cart 433 is paid, mobile self-checkout application 400 is terminated and the user exits the retail establishment at block 340.

Figure 19:
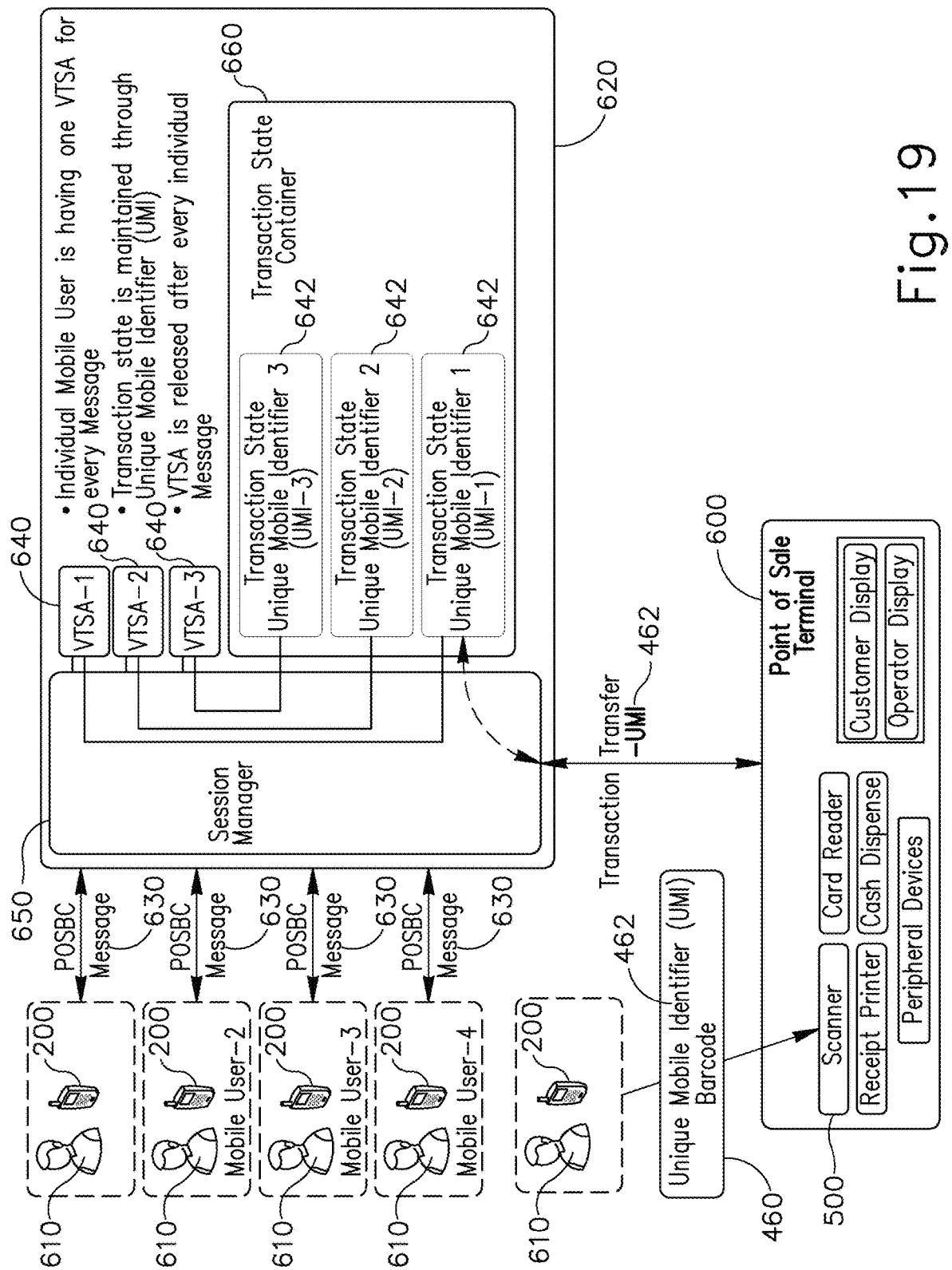
FIGS. 19, 20 and 21 depict various schematic representations of methods, apparatus (systems) and computer program products, in accordance with one embodiment of the present invention.
Figure 20:
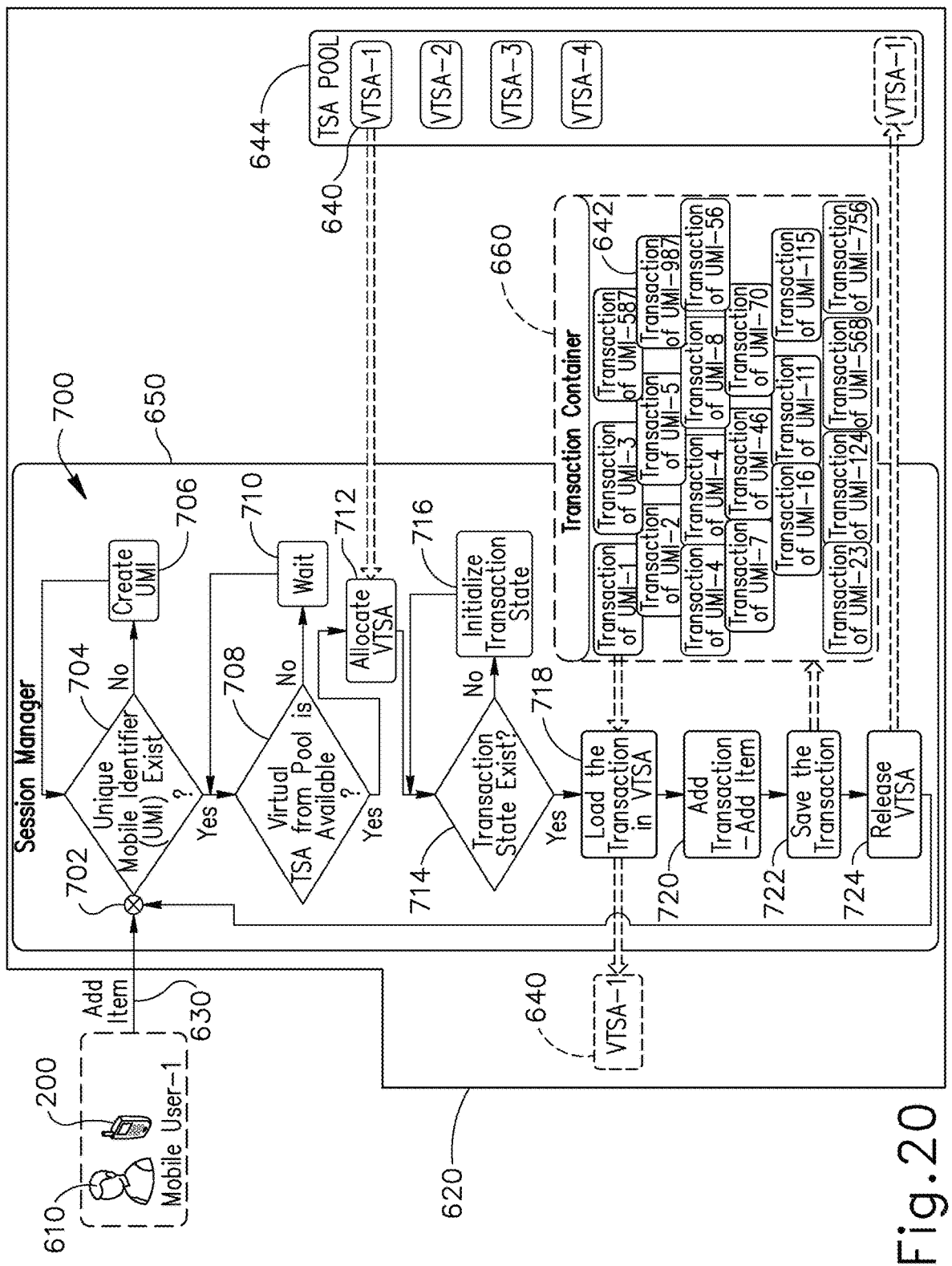
Figure 21:
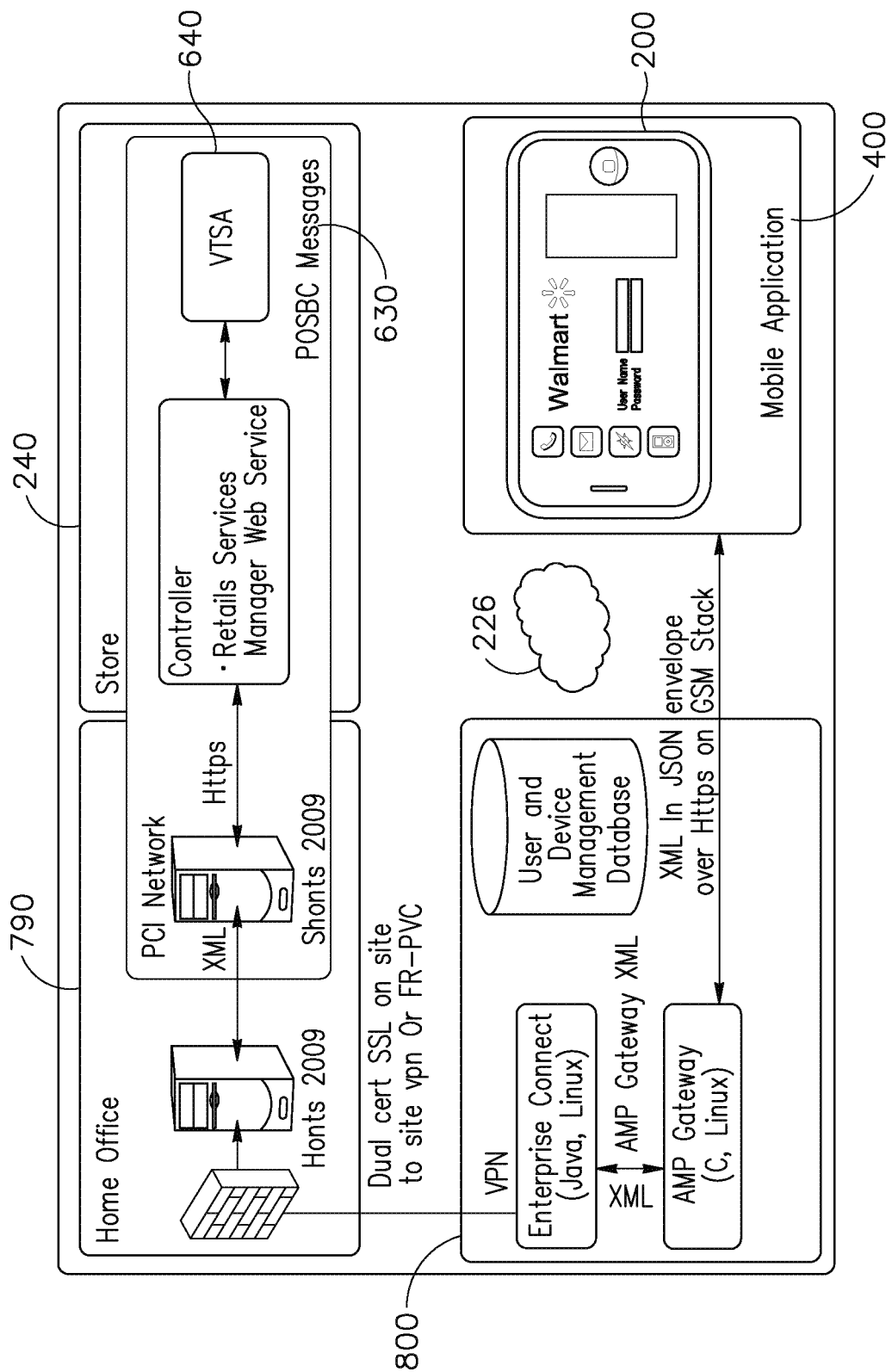

With reference to FIGS. 19, 20 and 21, a terminal sales application 620 for maintaining and conducting a virtual transaction is shown. Terminal sales application 620 includes a session manager 650 in communication with a Virtual Terminal Sales Application (VTSA) 640 and a transaction state container 660. A virtual transaction contains all of the information found within order 452 or virtual shopping cart 433, but is conducted entirely with an application, such as a VTSA 640 run within terminal sales application 620. Unlike real transactions which are processed on a point of sale terminal 600 having peripheral devices, a virtual transaction is processed with an application which mimics the functionality of a point of sale terminal 600 and is run on a computer which lacks the peripheral devices point of sale terminal 600. Terminal sales application 620 resides on a computer, such as distributed computing system 240, and interacts with mobile self-checkout application 400.

With reference to FIG. 19, terminal sales application 620 communicates with mobile self-checkout application 400 by receiving requests via Point of Sale (POS) messages 630 from the mobile self-checkout application 400 and by transmitting POS message 630 back to the mobile self-checkout application 400. POS messages 630 are messages which contain point-of-sale purchase information, such as Point of Sale Business Component messages used by point of sale terminals such as IBM™ Self Checkout Systems. In particular, session manager 650 of terminal sales application 620 communicates with mobile self-checkout application 400 by sending and receiving POS messages 630. POS messages 630 received by terminal sales application 620 contain a request to process information required for order 452, such as identification information 222, quantity information indicating how many units of a particular item 220 in the virtual shopping cart 433 a user 610 would like to purchase, user identification information, additional user information, an order number 463, store identifying information 410 which provides information that identifies the specific retail establishment in which the user is in, and a unique identifier 462 which identifies a specific virtual transaction, such as an order number 463 or a unique mobile identifier (UMI).

Each virtual transaction created or processed by terminal sales application 620 has a unique identifier 462 associated with it which identifies a specific order 452. The unique identifier 462 may be an order number 463 or a piece of identifying information which identifies a specific user 610 or a specific mobile device, such as a unique mobile identifier (UMI) or a user name or ID number. In one embodiment, the unique identifier 462 is a unique mobile identifier (UMI). By associating a unique identifier 462 with a specific virtual transaction, virtual transactions can be identified for each user 610 or mobile device 200 interacting with terminal sales application 620. Additionally, each POS message 630 received or transmitted by the terminal sales application 620 also includes a unique identifier associated with a virtual transaction. In this manner, each POS message 630 can be associated with and applied to the virtual transaction it was intended for.

Session manager 650 transmits and receives POS messages 630 to and from the mobile self-checkout application 400, and communicates the POS messages 630 to the VTSA 640. Additionally, session manager 650 interacts with a transaction state container 660 and communicates transaction state information 642 between the transaction state container 660 and the VTSA 640. Preferably, session manager 650 receives and prioritizes POS messages 630 received from mobile self-checkout application 400 in a queue and determines when a POS messages 630 is communicated to a given VTSA 640 and which VTSA 640 to communicate a given POS messages 630 to. Each time a POS message 630 is received from the mobile self-checkout application 400, the POS message 630 is routed by session manager 650 to an open session of an available VTSA 640 within terminal session manager 620. The unique identifier 462 embedded within POS message 630 is used by session manager 650 to locate transaction state information 642 associated with that unique identifier 462 used to conduct the virtual transaction for user 610. The transaction state information 642 is then sent by the session manager 650 to the VTSA 640 to which the POS message 630 having the same unique identifier 462 was routed, and then the session manager 650 instructs the VTSA 640 to start or further modify the virtual transaction for user 610. Preferably, session manager 650 can access an open session of a VTSA 640 from any one of a plurality of VTSAs 640 running within terminal sales application 620.

VTSA 640 is an application which represents a virtual point of sale terminal and is run on a computer, such as distributed computing system 240. VTSA 640 mirrors the functions of a traditional terminal sales application run on a point of sale terminal 600 without requiring the associated peripheral devices of a traditional point of sale terminal 600, such as a scanner or a bar code scanner, a receipt printer, a credit card reader, a cash dispenser, a customer display, an operator display, and other peripheral devices. Preferably, terminal sales application 620 includes a plurality of VTSAs 640, each of which is running a session. By operating a plurality of VTSAs 640 all within a single terminal sales application 620, substantial cost and money may be saved by not having to purchase multiple dedicated hardware devices, such as traditional point of sale terminals 600, each running only a single instance of a terminal sales application.

Each VTSA 640 maintains a virtual transaction by generating and maintaining transaction state information 642 associated with each virtual transaction using a unique identifier 462. Since none of the peripheral devices associated with a traditional point of sale terminal 600 are required, multiple VTSAs 640 can run simultaneously on a general-purpose computer, such as distributed computing system 240, in a virtual environment which simulates a traditional point of sale terminal 600 at less cost. Since multiple point of sale terminals 600 can be replaced in-part by a single computer, such as distributed computing system 240, running multiple instances of VTSA 640, such as VTSA-1 640, VTSA-2 640, VTSA-3 640, as shown in FIG. 19, significant cost savings can be incurred by using VTSAs 640 in addition to added flexibility with how the virtual transaction can be crated and maintained.

Every time a virtual transaction is created or modified in any way, for example when the user 610 creates a virtual shopping cart 433 in mobile-self checkout application 400 or adds items 220 to the virtual shopping cart 433, a POS message 630 is transmitted from mobile-self checkout application 400 to session manager 650. POS messages 430 received by session manager 650 are then put in a queue with an associated priority. Typically, POS messages 430 are prioritized in the order they were received. As a session of a VTSA 640 becomes available or open, the session manager 650 can access the open session and load transaction state information 642 along with a particular POS message 430 into the open session of VTSA 640. The VTSA 640, upon receiving the transaction state information 642 and the POS message 630, acts upon the contents of the POS message 630 and updates the transaction state information 642 associated with that particular POS message 430. For example, if a particular POS message 430 includes information that an additional item 220 has been added to a user 610's virtual shopping cart 433, then the transaction state information 642 associated with that particular POS message 430 is updated to reflect this new information.

Every time a POS message 430 is received by an open session of VTSA 640, transaction state information 642 associated with the POS message 430 is retrieved from the transaction state container 660 and transmitted to the same open session of VTSA 640. Transaction state information 642 defines the current state of a virtual transaction, and includes information such as a listing of every item 220 in virtual shopping cart 433 or specific virtual transaction, item information 432 for each item 220 in virtual shopping cart 433 or specific virtual transaction, quantity information indicating how many units of a particular item 220 in the virtual shopping cart 433 or specific virtual transaction a user 610 would like to purchase, user identification information, additional user information, an order number 463, store identifying information 410 which provides information that identifies the specific retail establishment in which the user is in, and a unique identifier 462 which identifies a specific user, such as a unique mobile identifier (UMI), amount totals for all the items 220 in virtual shopping cart 433 or specific virtual transaction, tax information for items 220 in virtual shopping cart 433 or specific virtual transaction, a receipt, a receipt identifier, and any other information or data that VTSA 640 may require to process a virtual transaction.

Transaction state information 642 associated with a unique identifier 462 changes each time a POS message 430 having that same unique identifier 462 is received by a user 610 or transmitted to a user 610 by session manager 650 using VTSA 640. Once a virtual transaction has been processed by the VTSA 640, any change in the transaction state information 642 is saved by VTSA 640 in the transaction state container 660 and the transaction state information 642 is exported from the VTSA 640. New transaction state information 642 for another virtual transaction is then imported into and opened by VTSA 640. By constantly importing and exporting transaction state information 642 upon processing each received POS message 630, a terminal sales application 620 can using multiple VTSAs 640 to maintain virtual transactions for a large number of users 610. For example, ten VTSAs 640, can manage and process as many as hundreds of virtual transactions, each with their own unique transaction state information 642, since not all of the virtual transactions need be active at any given time.

By importing, changing, and then exporting the transaction state information 642 each time a POS message 630 is received from a mobile device 200, instead of just keeping transaction state information 642 constantly open, the VTSA 640 allows the server 240 to support more users 610 and ultimately more orders 452. The process of being able to import and export the transaction state for each VTSA 640 by sending and receiving a unique identifier 462 is also known as transaction transfer, as opposed to a suspend/retrieve transaction which reprocesses every item in a virtual shopping cart. Transaction transfer allows for a real time import and export of the transaction state for each VTSA 640.

If the session manager 650 did not use transaction transfer, users 610 would be limited to the number of sessions of VTSA 640 running on the server 240 since each mobile user 610 would be statically connected to an instance of a VTSA 640 until the order 452 was complete. If, for example, ten sessions were running on the distributed computing system 240, then distributed computing system 240 would only be able to handle the virtual transactions of only ten mobile users 610 at one time.

Using transaction transfer allows the session manager 650 to import the transaction state information 642, if it exists for a specific virtual transaction, to an open session of a VTSA 640, process the current request within POS message 630 (such as adding another item 220 to a user 610s virtual shopping cart 433), save and export the transaction state information in a storage device or drive 130 by associated the virtual transaction or order 452 with a unique identifier 462, and then free that session of VTSA 640 up for the next mobile user 610. This allows the distributed computing system 240 to support many users 610 having many virtual transactions using only a limited number of, such as ten, sessions of VTSA 640 running on the server 240. Response time is the only variant, as opposed to being blocked until another user 610 is finished shopping.

Upon updating the transaction state information 642 associated with a particular POS message 430, a new POS message 630 is generated by the VTSA 640 and sent to the session manager 430. Depending on transaction state information 642, the POS message 630 is either routed back to the mobile device 200 and the mobile-self checkout application 400 or to a point of sale terminal 600. For example, if a user 610 has completed shopping and decided to transmit payment via the mobile device 200, or if the user is still shopping and adding items to the virtual shopping cart 433, then POS message 630 is routed back to the mobile device 200. However, if the user 610 has completed shopping and decided to transmit payment via a traditional cashier or self-checkout station, then POS message 630 is routed to point of sale terminal 600 whereupon the user 610 provides identifying information, such as a unique identifier 462 or optical machine-readable representation 460, to the point of sale terminal 600 and payment for order 452 is processed.

With reference to FIG. 21, transaction state information 642 can be maintained within distributed computing system 240, transferred to another distributed computing system 240 at another retail establishment, transferred to a home office server 790, or transferred to an enterprise server 800 and maintained at an enterprise level for access by multiple distributed computing systems at multiple retail establishments across an enterprise. In one embodiment, POS messages 630 can be received by a terminal sales application 620 running in an enterprise server 800 at the enterprise level, from a multitude of sources, such as a mobile shelf-checkout application 400 running on a mobile device 200, a point of sale terminal 600, a user accessing a website on the Internet, or from a web-based application running on a browser. In this manner, a virtual transaction can be maintained and modified from a plurality of POS messages 630 arriving from a multitude of sources. As a result, a first POS message 630 related to a particular virtual transaction may be generated by a mobile shelf-checkout application 400 running on mobile device 200 and a second POS message 630 related to the same transaction may be generated by a user accessing a website. For example, a first item 220 can be added to a virtual shopping cart 433 (represented by a particular virtual transaction) via mobile self-checkout application 400, and a second item 220 can be added to the same virtual shopping cart 433 via a user accessing a website.

In one embodiment, a virtual transaction representing a gift registry having a first item 220 and a second item 220 is generated. A first user 610 may purchase and pay for the first item 220, using a first method of purchase, such as for example the mobile self-checkout application 400, and a second user 610 can purchase and pay for the second item 220 using a second method of purchase, such as for example a website. Methods of purchase include mobile self-checkout application 400, a point of sale terminal 600, web-based applications, or information sent via a website.

In one embodiment, a first user 610 may purchase and pay for a first portion of a first item 220, using a first method of purchase, such as for example the mobile self-checkout application 400, and a second user 610 can purchase and pay for a second portion of first item 220 using a the first method purchase or a second method of purchase, such as for example a website. A portion of an item 220 refers to a portion of the purchase price of the item 220. For example, if a purchase price of the first item 220 is $500, the first user 610 may pay for a $200 portion of the $500 purchase price and a second user may pay for a $300 portion of the purchase price, completing the transaction.

In one embodiment, if a user 610 decides to provide payment for order 452 using a point of sale terminal 600, a POS message 630 is transmitted to the terminal sales application 620 indicating the desire for the user to conduct a virtual transaction for order 452, where information for order 452 resides in the distributed computing system 240 and an optical machine-readable representation 460 is generated by the terminal sales application 620 which is unique to each order 452. The optical machine-readable representation 460 is later transmitted to the mobile device 200 and displayed on the display 206.

In one embodiment, upon receiving the POS message 630, terminal sales application 620 generates a Virtual Terminal Sales Application (VTSA) 640 for each virtual transaction conducted by each user 610. Each VTSA 640 has its own unique identifier 462 generated for it, wherein each VTSA 640 and each unique identifier 462 associated with it represent a unique order 452. Transaction state information 642 is maintained for each VTSA 640 using the unique identifier 462. Upon generating a unique identifier 462 for an order 452, the unique identifier 462 is then transmitted to mobile device 200 via application 400 in the form of optical machine-readable representation 460, and also transmitted to the point of sale terminal 600, where the unique identifier 462 is used to identify order 452 and a user 610 associated with unique order 452.

The self-checkout station, in addition the cashier's point-of-sale terminal, also uses transaction transfer to import the transaction state using optical machine-readable representation 460 encoding a unique identifier 462 from the distributed computing system 240. The optical machine-readable representation 460 scanned from the mobile device 200 with scanning machine 500 encodes the unique identifier 462 which is then used by the point of sale terminal 600 to find the associated order 452 that resides on the distributed computing system 240.

With reference to FIG. 20, a POS message 630 is generated as a result of input from a user 610 and received by terminal sales application 620, and specifically session manager 650, and a method 700 for maintaining and conducting a virtual transaction is initiated at block 702. Method 700 is performed by terminal sales application 620 which resides on the server 240. Upon initiating method 700 at block 702, the method 700 awaits to receive a POS message 630. Upon receiving a POS message 630, method 700 then moves to block 704, whereupon it is determined if a unique identifier 462 or a unique mobile identifier (UMI) exists or not for a particular virtual transaction being referred to by user 610 within received POS message 630. If a unique identifier 462 or a unique mobile identifier (UMI) does not exist, then one is created by session manager 650 or retrieved from mobile device 200 by session manager 650 at block 706. The unique identifier 462 or unique mobile identifier (UMI) is then associated with the virtual transaction and method 700 moves from block 706 back to block 704. If a unique identifier 462 or a unique mobile identifier (UMI) does exist, then method 700 moves to block 708, whereupon it is determined if a Virtual Terminal Sales Application (VTSA) 640 is available for use. In one embodiment, a plurality of VTSAs 640 are operating within the terminal sales application 620, the plurality of VTSAs 640 referred to herein as a TSA Pool 644. In this embodiment, at block 708, it is determined if a VTSA 640 from TSA Pool 644 is available. If no VTSA 640 is available, then method 700 moves to block 710 and waits.

If a VTSA 640 is available, then method 700 moves to block 712 and allocates a VTSA 640 for conducting a virtual transaction in relation to the received POS message 630 and associated with the unique identifier 462 or UMI. When the VTSA 640 is allocated, a new session of the VTSA 640 is opened. Upon allocating a VTSA 640, method 700 then moves to block 714, whereupon it is determined if transaction state information 642 exists for the virtual transaction or not. If transaction state information 642 does not exist for the virtual transaction, then transaction state information 642 is initialized and generated at block 716 and then the method 700 moves back to block 714.

If transaction state information 642 does exist for the virtual transaction, then the method 700 moves to block 718, whereupon the transaction state information 642 is retrieved and loaded into the VTSA 640. If transaction state information 642 already existed and resides in transaction container 660, then the transaction state information 642 is retrieved from the transaction container 660 and loaded into the VTSA 640 at block 718.

Upon loading the transaction state information 642 into the VTSA 640, the method 700 then moves to block 720, whereupon a transaction item, received within POS message 630, is added to or processed within the virtual transaction by the VTSA 640. A transaction item is any portion of a virtual transaction, and includes such things as adding or removing an item 220 from virtual shopping cart 433, totaling items 220 within virtual shopping cart 433, a payment for all items 220, some items 220, one item 220, or a portion of one item 220 within virtual shopping cart 433 or a specific virtual transaction, indicating a payment method for an item 220 within virtual shopping cart 433 or a specific virtual transaction, or any other activity or bit of information associated with the virtual transaction.

Upon processing or adding the transaction item using VTSA 640, method 700 moves to block 722, whereupon the transaction state information 642 is saved by VTSA 640 within the transaction container 660. Transaction container 660 represents a location within a storage device for storing transaction state information 642. Upon saving the transaction state information 642, method 700 moves to block 724 and releases the VTSA 640 back into the TSA Pool 644, and closing the open VTSA 640 session, making VTSA 640 available for use by session manager 650 to process another request within a received POS message 630. Method 700 then moves back to block 702 and awaits the receipt of another POS message 630.

Figure 22:
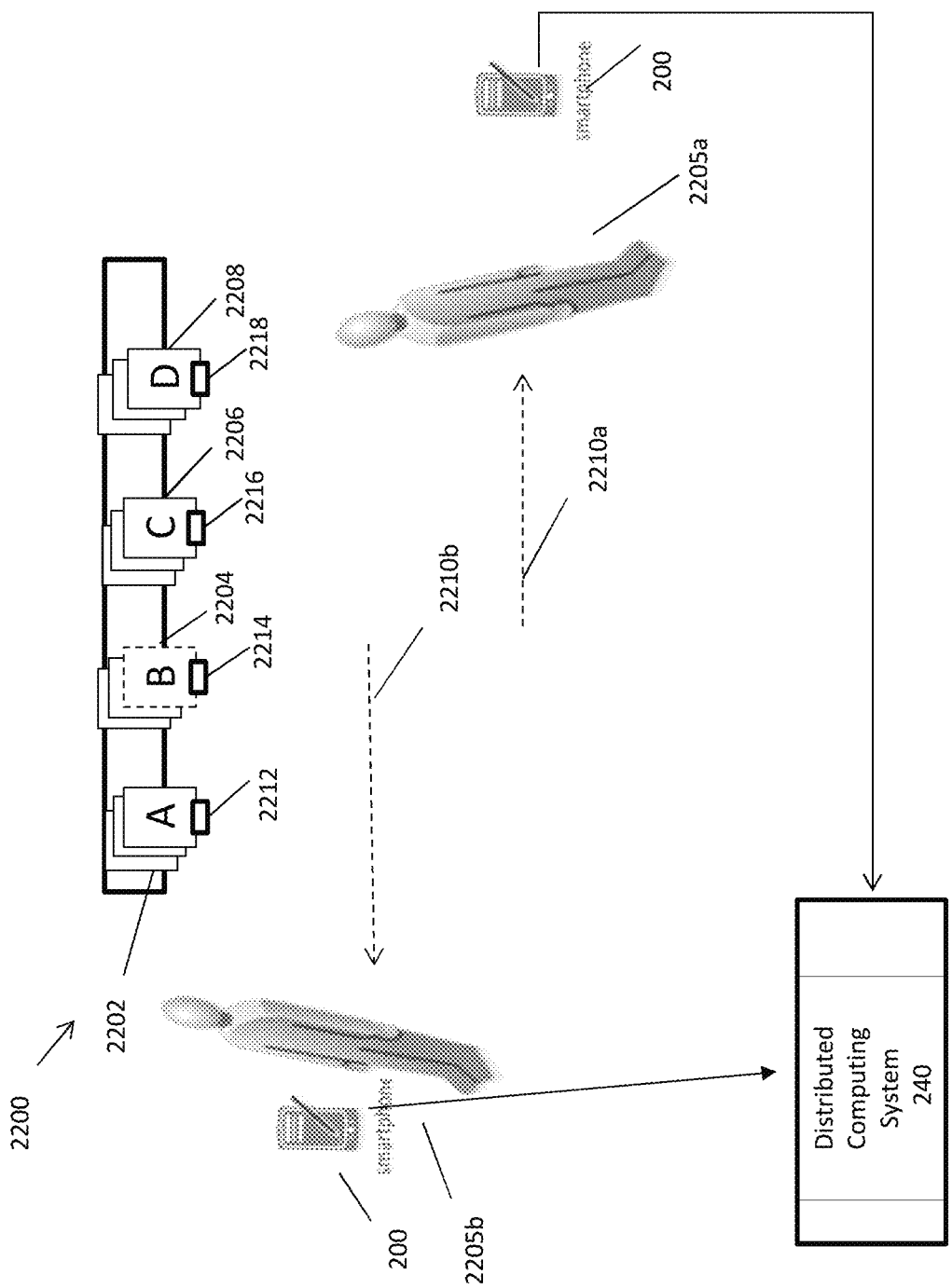
FIG. 22 is a block diagrams illustrating scanning of physical objects by a mobile device according to exemplary embodiments.

FIG. 22 is a block diagram illustrating an environment 2200 in which one or more mobile devices 200 read one or more identifiers (e.g., identifiers 2212, 2214, 2216, and 2218) associated with and/or affixed to geographically distributed physical objects 2202-2208 (e.g., physical objects A-D). The physical objects can be items (e.g. items 220 as shown in FIG. 1B) disposed in a retail store or facility. The mobile devices 200 can execute a mobile self-checkout application (e.g. mobile self-checkout application 400 as shown in FIG. 3). The mobile self-checkout application can present the items of Scan Items (e.g. scan items 412 as shown in FIG. 3) and the option of Begin Shopping (e.g. Begin Shopping 406 as shown in FIG. 3). In response to selecting the Scan Items and/or Being Shopping, the mobile device 200 can scan the identifiers associated with the physical objects.

Each of the physical objects 2202-2208 can be disposed in situ location (e.g., a resting or original location). Users 2205a-b of the mobile devices 200 may remove the physical objects that have been scanned by the mobile devices 200 from their in situ locations. Each in situ location can include like physical objects such that when one of the like physical objects is removed from its in situ location by one user, another user may remove another one of the like objects from its in situ location. The one or more mobile devices 200, can be configured to, scan different identifiers 2212-2218 of the different geographically distributed physical objects.

As non-limiting example of embodiments of the present disclosure, a user 2205a of mobile device 200 may scan (using the mobile device 200) the identifiers 2212, 2214, 2216, and 2218 for the physical object A, physical object B physical object C and physical object D, respectively, in the aforementioned order and may remove an instance of the physical objects A-D from their original location. A user 2205b of mobile device 200 may scan the identifier 2218, 2216, 2214 and 2212 of physical object D, physical object C, physical object B and physical object A, respectively, in the aforementioned order and may remove an instance of the physical objects A-D from their original location. As illustrated in FIG. 1B, the mobile devices 200 of users 2205a-b can each transmit a data set to a distributed computing system 240. The data sets can include the different identifiers 2212-2218 and the order in which the different identifiers 2212-2218 were scanned.

The distributed computing system 240 can be programmed to receive the data sets from the mobile devices 200 of users 2205a-b, and can retrieve the known in situ locations of the physical objects A-D based on the different identifiers 2212-2218 included in the data sets.

The in situ location of at least one of the different geographically distributed physical objects A-D may be unknown. For example, the distributed computing system 240 may retrieve the known in situ location for physical objects A, C and D; however, the in situ location for physical object B may be unknown by the distributed computing system 240. The distributed computing system 240 may generate paths (recreating/approximating a route traveled by the mobile devices based on the scans) 2210a-b of the mobile devices 200 of users 2205a-b based on the known in situ locations of the different geographically distributed physical objects A, C, and D. For example, the mobile device 200 of user 2205a scanned the identifier 2212 of physical object A, identifier 2216 of physical object C and identifier 2218 of physical object D in the respective order, and the distributed computing system can determine the path 2210a of the mobile device 200 of user 2205a based on the known in situ locations of physical object A, physical object C, and physical object D. That is, the distributed computing system 240 can determine that the path 2210a of the mobile device 200 of user 2205a by determining that the mobile device 200 scanned the identifier 2212 of physical object A before scanning the identifier 2214 of physical object B and scanned the identifier 2216 of physical object C and the identifier 2218 of physical object D after scanning the identifier 2214 of physical object B.

Similarly, the distributed computing system 240 may generate a path 2210b of the mobile device of user 2205b based on the mobile device 200 of user 2205b scanning the identifier 2218 of physical object D, identifier 2216 of physical object C and identifier 2212 physical object A. The distributed computing system 240 can generate the paths by mapping data points of scanned identifiers with known in situ locations. For example, the distributed computing system 240 can determine that the mobile device 200 of user 2205b scanned the identifier 2218 of physical object D, and the identifier 2216 of physical object C before the identifier 2214 of physical object B and scanned the identifier 2212 of physical object A after scanning the identifier 2214 of physical object B. Consequently, the distributed computing system 240 may determine the path 2210b of the mobile device 200 of user 2205b. Using the paths (e.g., 2210a and 2210b), the distributed computing system 240 can determine the in situ location of physical object B. For example, the distributed computing system 240 can identify an intersection of the paths and/or the physical objects that are nearest to the physical object B based on the order with which physical objects are scanned by mobile devices. In some embodiments, the distributed computing system 240 can verify the accuracy of the determined location of physical object B by interpolating the in situ location as an added data point at a point along the path a data point representing the determined location of physical object B, overlaying an existing map including a designated location for physical object B over the data points and determining if the data points correlate with the designated location for physical object B on the existing map.

In exemplary embodiments, in response to determining the location of physical object B based on the paths (e.g., paths 2210a-b), the distributed computing system 240 can trigger one or more events. The one or more events can include, for example, issuing an alert, storing the determined in situ location of a physical object having a previously unknown in situ location, determining a new location to move the physical object. For example if physical object B is not supposed to be at the determined in situ location, an alert can be sent out to move physical object B.

In exemplary embodiments, the distributed computing system can determine whether a mobile device followed a logical path when scanning objects, and based on such a determination can choose to include or exclude the set of data from the mobile device. As one example, the distributed computing system can receive a set of data from a mobile device that preserves the order in which the objects were scanned. Upon retrieving known in situ location for at least some of the objects and associating the known in situ locations with the order in which the at least some of the objects were scanned, the distributed computing system can determine that followed an arbitrary, unplanned, or illogical path. Once the distributed computing system determines that the mobile device did not follow a logical path, the distributed computing system can omit the set of data from the mobile device from the process of determining the in situ locations from objects with unknown in situ locations. Conversely, based on the order in which the objects are scanned and the in situ location of at least some of the objects, the distributed computing system can determine that the mobile device followed a methodical, planned, and/or logical path when scanning the objects. Once the distributed computing system determines that the mobile device followed a logical path, the distributed computing system can include the data set from the mobile device in the process for determining the in situ locations of object with unknown in situ locations.

In continuing the above example, with reference to FIG. 1, the mobile device 200 of user 2205a can scan the identifiers 2214 of physical object B, identifier 2212 of physical object A, identifier 2218 of physical object D and identifier 2216 of physical object C in the aforementioned order. The mobile device 200 of user 2205a can transmit the identifiers to the distributed computing system 240. The distributed computing system 240 can receive the scanned identifiers and query the database for the known in situ locations of the physical objects associated with the identifiers, and based on the order in which the objects are scanned, the distributed computing system can determine that the mobile device 200 scanned the identifiers out of order (e.g., did not progress along a logical path to collect the objects). For example, the distributed computing system can determine the known in situ locations for physical objects A, C, and D. Furthermore, the distributed computing system 240 can determine the mobile device 200 of user 2205a scanned the identifier 2212 for physical object A before scanning identifier 2218 for physical object D and subsequently scanned the identifier 2216 for physical object C. The distributed computing system 240 can determine the physical object A is disposed on the left of physical object D, and physical object D is disposed to the right of physical object C. Therefore, the distributed computing system 240 cannot determine a path based on the order of the scans. The distributed computing system 240 can disregard the scans due to the inability to determine a path.

In one application, exemplary embodiments of the present disclosure can be implemented to locate a product in a retail store. Users 2205a-b may scan identifiers of products as using their mobile devices as the users walk around the retail store. The products can be disposed in their in situ locations (e.g., locations within the retail store at which the products are disposed). Users 2205a-b of the mobile devices 200 may remove the products that have been scanned by the mobile devices 101 from their in situ locations (e.g., by placing the products in the cart). The identifiers 2212-2218 may be an optical machine-readable representation (as described above) such as a barcode, QR code or RFID tag.

While an example embodiment has been described as using two paths to determine the in situ location of a physical object having a previously unknown in situ location, exemplary embodiments of the present disclosure can utilize one or more paths determined based on scans captured by one or more mobile devices. For example, accuracy of the determined in situ location for a physically object can increase as the quantity of paths increases. For example, one hundred paths can provide a more accurate estimate of the in situ location of an object than ten paths.

Figure 23:
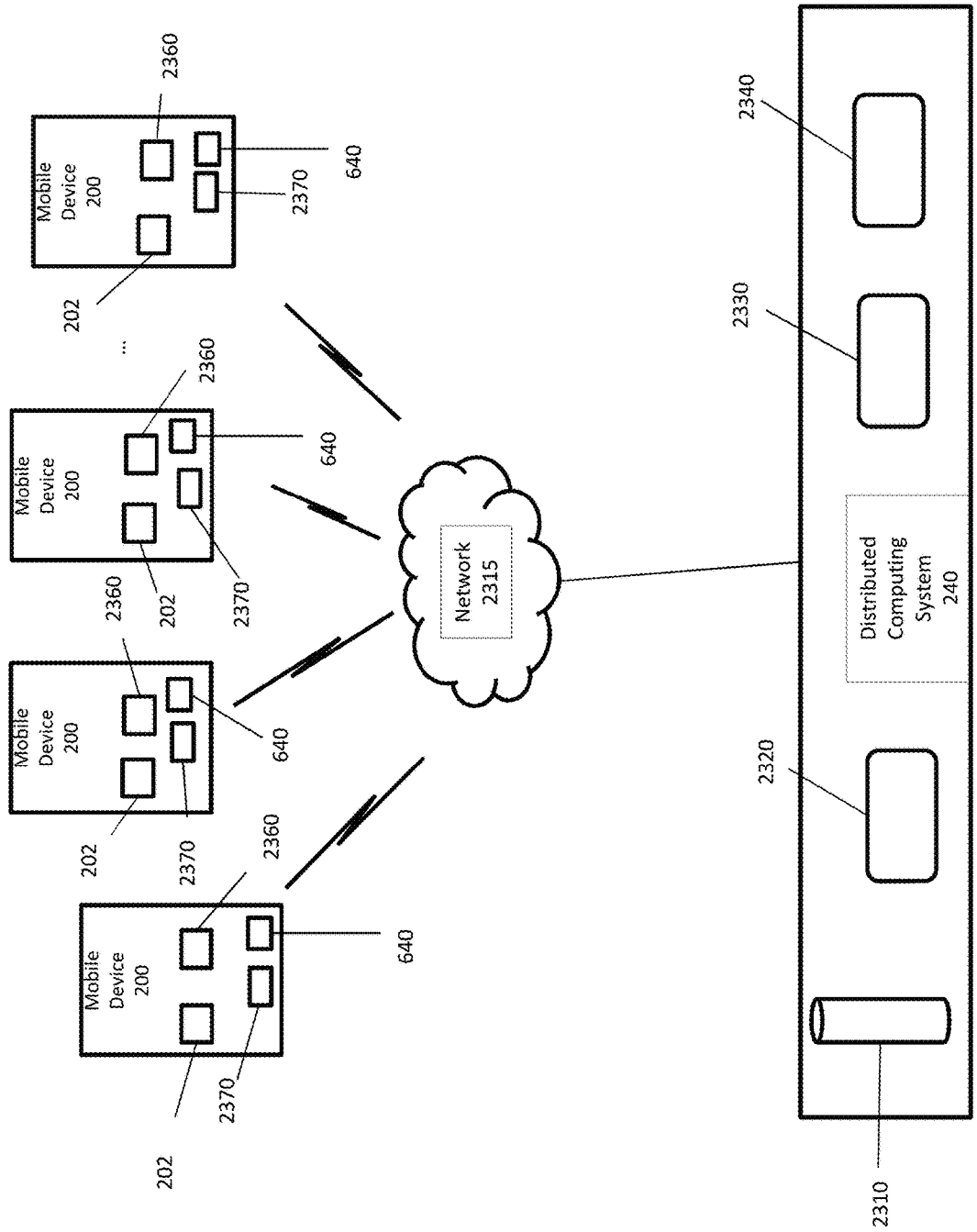
FIG. 23 illustrates an exemplary network environment for a location system in accordance with exemplary embodiments of the present disclosure.

FIG. 23 illustrates an exemplary network environment of the object location tracking system 2350 in accordance with exemplary embodiments of the present disclosure. In exemplary embodiments, the network environment includes mobile devices 200 in communication with a distributed computing system 240 via a network 2315. The distributed computing system 240 may include a database 2310, a path generating module 2320, a location finder module 2330 and an event module 2340. The database 2310 may store data including but not limited to: names of physical objects, locations of physical objects, and quantities of physical objects. The database 2310 may also store a map of a facility within which the physical objects are disposed. The mobile devices 200 can execute an instance of the terminal sales application. 640.

In an example embodiment, one or more portions of network 2315 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In exemplary embodiments, one or more mobile device 200 can include a processor 2370 and one or more readers such as an optical reader 202, an RFID reader 2360, and/or the like. The reader(s) 202, 2360 can be included in the one or more mobile devices 200 and/or can be a stand-alone device that can be physical and/or electrically coupled to the one or more mobile devices 200. As mentioned above, for embodiments utilizing the optical reader 202, the optical reader 202 can be configured to read optical machine-readable representations (e.g., barcodes, QR codes). For embodiments utilizing the RFID reader 2360, the RFID reader 2360 can be configured to read RFID tags. The one or more mobile devices 200, using the reader(s) 202, 2360, can be configured to, scan a different identifiers 112-118 (as shown in FIGS. 1A-B) of the different geographically distributed physical objects. of a different geographically distributed physical objects.

The mobile device 200 may execute an instance of the terminal sales application 640. The terminal sales application 640 can trigger the operation of the readers 202, 2360. The mobile devices 200 scan the identifiers (e.g. identifiers 2212, 2214, 2216, and 2218 as shown in FIG. 22) associated with for the physical objects (e.g. physical objects A-D) using the readers 202, 2360. The mobile devices 200, via the terminal sales application 640, can transmit data sets including the different identifiers associated with the physical objects and the order in which the identifiers are scanned to the distributed computing system 240.

The distributed computing system 240 may receive the different identifiers associated with the geographically distributed physical objects from the mobile devices 200. The location finder module 2330 within the distributed computing system 240 may query the database 2310 for known in situ location of the physical objects based on the different identifiers. The in situ location of at least one of the different geographically distributed physical objects may be unknown. The location finder module 2330 may communicate the known in situ locations of physical objects to the path generator module 2320. The path generator module 2320 may generate a path of the mobile devices 200 based on the known in situ locations of the different geographically distributed physical objects and based on the chronological order of the scans the identifiers of mobile devices 200. The path generator module 2320 may communicate the generated paths for the mobile devices 200 to the location finder module 2330.

The location finder module 2330 may determine the in-situ location for physical object for which the in situ location is unknown, using the projected paths of the mobile devices 200. For example, the location finder module 2330 may place data points for the scanned identifiers by the mobile devices 200 with the known in-situ locations and correlate the data points to the generated paths. The location finder module 2330 may determine the location of the physical object for with the in situ location is unknown, based on the projected paths of the mobile devices 200 and the data points based on the scanned identifiers. The location finder module 2330 can verify the accuracy of the determined location physical object for which the in situ location was unknown, by interpolating the in situ location as an added data point at a point along the projected path a data point representing the determined location the physical object, overlaying an existing map including a designated location for physical object over the data points and determining if the data points correlate with the designated location for physical object on the existing map.

In exemplary embodiments, in response to determining the location the physical object, the event module 2340 can trigger an event. The event is one or more of, issuing an alert, storing the determined location of the at least one physical object, determining a new location to move the physical object. For example, physical object is not designated to be at the determined location, an the event module 2340 may send an alert to move the physical object to the designated location.

FIG. 24 is a flowchart illustrating an exemplary process in accordance with exemplary embodiments of the present disclosure. In exemplary embodiments, in operation 2400 scanning, via one or more mobile devices (e.g., mobile devices 200 shown in FIGS. 1B-1C and 3-23) of users (e.g., users 2205a-b shown in FIG. 22) different identifiers (e.g., identifiers 2212-2218 shown in FIG. 22) of different geographically distributed physical objects (e.g., physical objects A-D shown in FIG. 22). The mobile devices can be executing a terminal sales application. The mobile devices are communicatively coupled to a distributed computing system (e.g., the distributed computing system 240 shown in FIGS. 1B, 22 and 23). For example, mobile devices can be used to scan the identifiers of physical objects. The identifiers may be optical machine readable representations such as barcodes, QR codes or RFID tags.

In operation 2402, the mobile devices can transmit data sets including the different identifiers that were scanned and the order in which the identifiers were scanned to the distributed computing system. In operation 2404, the distributed computing system can receive the different identifiers for the different geographically distributed physical objects. In operation 2406, the location finder module within the distributed computing system can query the database for known in situ locations of the physical objects based on the different identifiers included in each of the data sets. The database may store designated location information associated physical objects. In exemplary embodiments, a location of a physical object associated with an identifier included in the data sets can be unknown such that the distributed computing system may be unable to retrieve and/or identify the location of physical object from the database.

In operation 2408, the path generator within the distributed computing system can generate paths that the mobile devices traversed when they scanned the different identifiers based on the known locations of physical objects and an order in which the identifiers were scanned.

In operation 2410, the location finder module within the distributed computing system may determine the in-situ location of the physical object having a previously unknown in situ location based on the generated paths. For example, the known locations of physical objects can be placed as data points on a map, while the location for physical object may remain unknown. The distributed computing system can determine that the physical object having the unknown in-situ location is located between certain physical objects in the data sets based on intersections of the paths of the mobile devices and/or the locations of the physical objects corresponding the identifiers that were scanned immediately previous to and/or immediately after the physical object having the unknown in situ location is scanned.

In some embodiments, in response to determining a location of the physical object having a previously unknown location, the distributed computing system may verify the location is a where the physical object is supposed to be disposed. The distributed computing system may generate a projected path by placing data points at the known location of physical objects. The distributed computing system may overlay a map of a facility on the data points to verify the location of physical object.

In some embodiments, in response to determining the location of physical object, an event module within the distributed computing system may trigger an event. The event may be to query the database using the location and determine if another physical object belongs in the location. In other embodiments, the distributed computing system may store the location of physical object in the database. In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present invention. Further still, other aspects, functions and advantages such as different combinations of the described embodiments are also within the scope of the present invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A system comprising:
a distributed computing system;
one or more mobile devices communicatively coupled to the distributed computing system, including a processor and an optical reader, one or more of the mobile devices being configured to (i) scan a plurality of different identifiers of a plurality of different geographically distributed physical objects, and (ii) transmit the plurality of different identifiers to the distributed computing system;
wherein the distributed computing system is programmed to:
receive the plurality of different identifiers for the plurality of different geographically distributed physical objects;
query a database for known locations of the plurality of different geographically distributed physical objects using the plurality of different identifiers, wherein a location of at least one of the plurality of different geographically distributed physical objects is unknown;
interpolate each of the known locations of the plurality of different geographically distributed physical objects as a data point;
retrieve a map of a facility in which the plurality of different geographically distributed physical objects are designated to be disposed from the database;
overlay the map including locations at which each physical object of the plurality of different geographically distributed physical objects are designated to be disposed, over the data points representing each known location of the physical objects;

determine whether the data points representing each of the known locations of each of the physical objects correlate with the designated locations of each physical object;

generate one or more projected paths of the one or more of mobile devices based on the data points, wherein generating the one or more projected paths includes omitting at least one data point determined to be arbitrary, unplanned, or illogical; and determine the location of the at least one physical object based on a chronological order of each scan each of the plurality of different identifiers of the plurality of different geographically distributed physical objects and one or more projected paths.

2. The system of claim 1, wherein in response to determining a location of the at least one physical object, verify the location is where the physical object is supposed to be disposed.

3. The system of claim 1, wherein the distributed computing system is further configured to determine the location of the at least one physical object based on an intersection of two or more of the projected paths.

4. The system in claim 3, wherein in response to determining the location of the at least one physical object based on an intersection of two or more of the projected paths the distributed computing system triggers an event.

5. The system in claim 4, wherein the event is one or more of: issuing an alert, storing the determined location of the at least one physical object, determining a new location to move the physical object.

6. The system in claim 1, wherein the mobile device is one or more of: a mobile phone, a portable digital assistant, a laptop computer, a tablet device, or a wireless portable device.

7. A method comprising:
scanning, via one or more mobile devices communicatively coupled to a distributed computing system, including a processor and an optical reader, a plurality of different identifiers of a plurality of different geographically distributed physical objects;

transmitting, via the one or more mobile devices, the plurality of different identifiers to the distributed computing system;

receiving, via the distributed computing system, the plurality of different identifiers for the plurality of different geographically distributed physical objects;

querying, via the distributed computing system, a database for known locations of the plurality of different geographically distributed physical objects using the plurality of different identifiers, wherein a location of at least one of the plurality of different geographically distributed physical objects is unknown;

interpolating, via the distributed computing system, each of the known locations of the plurality of different geographically distributed physical objects as a data point;

retrieving, via the distributed computing system, a map of a facility in which the plurality of different geographically distributed physical objects are designated to be disposed from the database;

overlaying, via the distributed computing system, the map including locations at which each physical object of the plurality of different geographically distributed physical objects are designated to be disposed, over the data points representing each known location of the physical objects;

determining, via the distributed computing system, whether the data points representing each of the known locations of each of the physical objects correlate with the designated locations of each physical object;

generating, via the distributed computing system, one or more projected paths of the one or more of mobile devices based on the data points, wherein generating the one or more projected paths includes omitting at least one data point determined to be arbitrary, unplanned, or illogical; and determining, via the distributed computing system, the location of the at least one physical object based on a chronological order of each scan of the plurality of different identifiers of the plurality of different geographically distributed physical objects.

8. The method of claim 7, further comprising in response to determining a location of the at least one physical object, verifying, via the distributed computing system, the location is where the physical object is supposed to be disposed.

9. The method of claim 7, further comprising determining, via the computing system, the location of the at least one physical object based on an intersection of two or more of the projected paths.

10. The method in claim 9, further comprising in response to the distributed computing system determining the location of the at least one physical object based on an intersection of two or more of the projected path paths, triggering, via the distributed computing system, an event.

11. The method in claim 10, wherein the event is one or more of: issuing an alert, storing the determined location of the at least one physical object, determining a new location to move the physical object.

12. The method in claim 7, wherein the mobile device is one or more of: a mobile phone, a portable digital assistant, a laptop computer, a tablet device, or a wireless portable device.

13. One or more non-transitory computer readable memory media storing instructions, wherein the instructions are executable by one or more processors to:

scan, via one or more mobile devices communicatively coupled to a distributed computing system, including a processor and an optical reader, a plurality of different identifiers of a plurality of different geographically distributed physical objects;

transmit, via the one or more mobile devices, the plurality of different identifiers to the distributed computing system;

receive, via the distributed computing system, the plurality of different identifiers for the plurality of different geographically distributed physical objects;

query, via the distributed computing system, a database for known locations of the plurality of different geographically distributed physical objects using the plurality of different identifiers, wherein a location of at least one of the plurality of different geographically distributed physical objects is unknown;

interpolate, via the distributed computing system, each of the known locations of the plurality of different geographically distributed physical objects as a data point;

retrieve, via the distributed computing system, a map of a facility in which the plurality of different geographically distributed physical objects are designated to be disposed from the database;

overlay, via the distributed computing system, the map including locations at which each physical object of the plurality of different geographically distributed physical objects are designated to be disposed, over the data points representing each known location of the physical objects;

determine, via the distributed computing system, whether the data points representing each of the known locations of each of the physical objects correlate with the designated locations of each physical object;

generate, via the distributed computing system, one or more projected paths of the one or more of mobile devices based on the data points, wherein generating the one or more projected paths includes omitting at least one data point determined to be arbitrary, unplanned, or illogical; and determine, via the distributed computing system, the location of the at least one physical object based on a chronological order of each scan of the plurality of different identifiers of the plurality of different geographically distributed physical objects.

14. The one or more non-transitory computer readable media of claim 13, wherein in response to determining a location of the at least one physical object, execution of the instructions by the one or more processors causes the one or more processors to verify the location is a where the physical object is supposed to be disposed.

15. The one or more non-transitory computer readable media of claim 13, wherein the instructions are executable by one or more processors to determine, via the computing system, the location of the at least one physical object based on an intersection of two or more of the projected paths.

16. The one or more non-transitory computer readable media of claim 15, wherein in response to the distributed computing system determining the location of the at least one physical object based on an intersection of two or more of the projected paths, execution of the instructions by the one or more processors causes one or more processors to trigger an event.

17. The one or more non-transitory computer readable media of claim 16, wherein the event is one or more of: issuing an alert, storing the determined location of the at least one physical object, determining a new location to move the physical object.

* * * * *